A routing structure for a saddle type vehicle for suppressing an increase in the number of parts while the appearance of play is suppressed. The routing structure for a saddle type vehicle includes a cable guide portion formed integrally with a storage box and configured to guide an operational cable of a wire cable structure. The cable guide portion is formed in a shape of a gutter along an outer side of a peripheral edge of an opening of the storage box.

(12) United States Patent
Ibaraki et al.

(10) Patent No.: US 9,221,512 B2
(45) Date of Patent: Dec. 29, 2015

(54) ROUTING STRUCTURE FOR SADDLE TYPE VEHICLE

(71) Applicant: HONDA MOTOR CO., LTD., Tokyo (JP)

(72) Inventors: Yuya Ibaraki, Wako (JP); Takasumi Yamanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/921,434

(22) Filed: Jun. 19, 2013

(65) Prior Publication Data
US 2014/0061268 A1 Mar. 6, 2014

(30) Foreign Application Priority Data
Aug. 28, 2012 (JP) ................. 2012-187257

(51) Int. Cl.
  B62J 9/00 (2006.01)
  B62J 1/12 (2006.01)
  B62K 19/46 (2006.01)
  B62J 99/00 (2009.01)

(52) U.S. Cl.
  CPC .. B62J 9/005 (2013.01); B62J 1/12 (2013.01); B62K 19/46 (2013.01); B62J 2099/0046 (2013.01); B62K 2202/00 (2013.01)

(58) Field of Classification Search
CPC .... B62J 9/005; B62J 2099/0046; B62K 19/46
USPC .............. 280/769; 224/413; 180/219
See application file for complete search history.

(56) References Cited

U.S. PATENT DOCUMENTS

| | | | | |
|---|---|---|---|---|
| 6,237,710 | B1 * | 5/2001 | Mori et al. .................... | 180/219 |
| 6,623,071 | B2 * | 9/2003 | Kawamoto et al. ...... | 297/195.13 |
| 7,028,800 | B2 * | 4/2006 | Yagisawa et al. ............. | 180/219 |
| 7,219,939 | B2 * | 5/2007 | Kamemizu et al. .......... | 296/37.1 |
| 7,290,632 | B2 * | 11/2007 | Hanagan ....................... | 180/219 |
| 7,562,734 | B2 * | 7/2009 | Yano et al. .................... | 180/219 |
| 7,708,326 | B2 * | 5/2010 | Misaki et al. ................. | 296/37.1 |
| 8,534,406 | B2 * | 9/2013 | Nakajin et al. ................ | 180/219 |
| 8,651,213 | B2 * | 2/2014 | Nagakubo et al. ............ | 180/218 |
| 2001/0022247 | A1 * | 9/2001 | Mori et al. .................... | 180/219 |

FOREIGN PATENT DOCUMENTS

JP  2006-218899 A  8/2006

* cited by examiner

*Primary Examiner* — Brodie Follman
*Assistant Examiner* — Brian Cassidy
(74) *Attorney, Agent, or Firm* — Birch, Stewart, Kolasch & Birch, LLP

(57) ABSTRACT

A routing structure for a saddle type vehicle for suppressing an increase in the number of parts while the appearance of play is suppressed. The routing structure for a saddle type vehicle includes a cable guide portion formed integrally with a storage box and configured to guide an operational cable of a wire cable structure. The cable guide portion is formed in a shape of a gutter along an outer side of a peripheral edge of an opening of the storage box.

20 Claims, 20 Drawing Sheets

ROUTING STRUCTURE FOR SADDLE TYPE VEHICLE

CROSS-REFERENCE TO RELATED APPLICATIONS

The present application claims priority under 35 USC 119 to Japanese Patent Application No. 2012-187257 filed Aug. 28, 2012 the entire contents of that are hereby incorporated by reference.

BACKGROUND OF THE INVENTION

1. Field of the Invention

The present invention relates to a routing structure for a saddle type vehicle that includes a storage box and a guide section formed integrally on the storage box and configured to guide a pipe.

2. Description of Background Art

A saddle type vehicle such as a scooter type motorcycle is known that includes a hose locking section for locking a fuel hose on a side wall of a storage box. See, for example, Japanese Patent Laid-Open No. 2006-218899. In Japanese Patent Laid-Open No. 2006-218899, the fuel hose is locked by the hose locking section to guide the fuel hose. More particularly, the hose locking section functions as a pipe guide section for guiding a hose that is a kind of pipe.

Since the conventional configuration guides the fuel hose, this is a configuration that has no problem even if a play appears between the guides. In addition, the conventional configuration does not guide a cable that has a sliding member (for example, an inner cable) in an outer tube of a wire cable or the like.

Where a cable having a sliding member in the inside thereof is guided, there is the possibility that, if a play appears between guides, then the sliding amount of the sliding member may vary. Therefore, it is necessary to suppress the appearance of play using such a countermeasure as to increase the number of guides.

SUMMARY AND OBJECTS OF THE INVENTION

The present invention has been made in view of such a situation as described above. It is an object of an embodiment of the present invention to provide a routing structure for a saddle type vehicle that suppresses an increase of the number of parts while suppressing the appearance of play.

In order to solve the problem described above, according to an embodiment of the present invention, there is provided a routing structure for a saddle type vehicle that includes a storage box (44), and a guide portion (161) formed integrally with the storage box (44) and configured to guide a pipe (123), wherein the pipe (123) is a cable that includes an outer tube (121A) and a sliding article (121B) in the inside of the outer tube. The guide portion (161) is formed in a shape of a gutter along an outer side of a peripheral edge of an opening (44K) of the storage box (44).

According to an embodiment of the present invention, the guide portion, formed integrally with the storage box and configured to guide the pipe, is a cable that includes a sliding article in the inside of the outer tube. Since this guide portion is formed in a shape of a gutter along an outer side of a peripheral edge of the opening of the storage box, the guide portion that is long can be formed making use of the peripheral edge of the opening of the accommodation box. Consequently, while a play of the cable is suppressed, an increase in the number of parts can be suppressed. Further, it is possible to raise the rigidity of the peripheral edge of the opening by the guide portion.

According to an embodiment of the present invention, the routing structure for a saddle type vehicle may be configured such that a seat (10) that covers the storage box (44) so as to open or close the storage box (44) is provided above the storage box (44). The storage box (44) is formed long in a forward and rearward direction of the vehicle. A seat lock apparatus (372) is provided behind the storage box (44) while a seat lock cancellation apparatus (143) is provided in front of the storage box (44). In addition, the pipe (123) is a seat locking cable that actuates the seat lock apparatus (372). With the present configuration, the cable length can be minimized and the operability for the lock cancellation is improved.

According to an embodiment of the present invention, the routing structure for a saddle type vehicle may be configured such that a vehicle body cover (59) is provided on the outer side of the guide portion (161), and the guide portion (161) is disposed in a space formed by the vehicle body cover (59) and the storage box (44). With the present configuration, exposure of the cable can be suppressed, and access to the cable can be made difficult thereby to achieve suppression of vandalism or the like.

According to an embodiment of the present invention, the peripheral edge of the opening (44K) of the storage box (44) may include a curved portion (44B, 95F) that forms a projected portion (163A, 164A) or a recessed portion (163B) as viewed in plan. With the present configuration, the cable can be guided in a curved state, and the necessity for a special fixing member for carrying out the positioning of the cable in the longitudinal direction can be eliminated. Consequently, a play of the cable can be reduced with a simple and easy configuration.

According to an embodiment of the present invention, the routing structure for a saddle type vehicle may be configured wherein the guide portion (161) is formed in a recessed shape open upwardly and a vehicle body cover (59) is disposed at an end portion of the guide portion (161) on the open side. With the present configuration, the periphery of the cable can be surrounded by the guide portion and the vehicle body cover. Consequently, a guiding effect of the cable can be increased. In addition, the protection of the cable can be enhanced.

According to an embodiment of the present invention, the routing structure for a saddle type vehicle may be configured such that a head pipe (12), a down frame (15) extending downwardly and rearwardly from the head pipe (12) and a seat rail (14) connected to the down frame (15) and extending upwardly and rearwardly wherein the down frame (15) is provided. Thus, the pipe (123) is routed from an upper portion of the down frame (15) to a rear portion side of the seat rail (14) and extends to a position wherein the storage box (44) overlaps with the down frame (15) as viewed in side elevation. A curved guide portion (151) that guides the pipe (123) in a curved state is formed integrally on the storage box (44) in front of the guide portion (161). With the present configuration, the cable guides for the vehicle body frame can be reduced as far as possible thereby to reduce the number of parts.

According to an embodiment of the present invention, a fixing portion (166) to which the vehicle body cover (59) is fixed may be provided on the vehicle body cover (59) and the peripheral edge of the opening of the storage box (44). Thus, with the present configuration, access to the cable can be made more difficult.

According to an embodiment of the present invention, the guide portion formed integrally with the storage box and configured to guide the pipe is a cable that includes a sliding article in the inside of an outer tube. The guide portion is formed in a shape of a gutter along the outer side of the peripheral edge of the opening of the storage box. Therefore, while play of the cable is suppressed, an increase of the number of parts can be suppressed.

Further, if the seat that covers the storage box so as to open or close the storage box is provided above the storage box, and the storage box is formed long in the forward and rearward direction of the vehicle and the seat lock apparatus is provided behind the storage box while the seat lock cancellation apparatus is provided in front of the storage box and the pipe is a seat locking cable that actuates the seat lock apparatus, then the cable length can be minimized and the operability for the lock cancellation is improved.

Further, if the vehicle body cover is provided on the outer side of the guide portion and the guide portion is disposed in the space formed by the vehicle body cover and the storage box, then exposure of the cable can be suppressed and access to the cable can be made difficult.

Further, if the peripheral edge of the opening of the storage box includes the curved portion that forms a projected portion or a recessed portion as viewed in plan, then the cable can be guided in a curved state and the necessity for a special fixing member for carrying out the positioning of the cable in the longitudinal direction can be eliminated.

Further, if the guide portion is formed in a recessed shape open upwardly and the vehicle body cover is disposed at an end portion of the guide portion on the open side, then the periphery of the cable can be surrounded by the guide portion and the vehicle body cover. Consequently, a guiding effect of the cable can be raised and also protection of the cable can be anticipated.

Further, the pipe is routed from an upper portion of the down frame that extends downwardly and rearwardly from the head pipe to a rear portion side of the seat rail that extends upwardly and rearwardly. Further the pipe extends to a position at which the storage box overlaps with the down frame as viewed in side elevation. In addition, the curved guide portion that guides the pipe in a curved state is formed integrally on the storage box in front of the guide portion. Thus, the cable guides for the vehicle body frame can be reduced as far as possible thereby to reduce the number of parts.

According to an embodiment of the present invention, the fixing portion to which the vehicle body cover is fixed is provided on the vehicle body cover and the peripheral edge of the opening of the storage box. Thus, access to the cable can be made more difficult.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
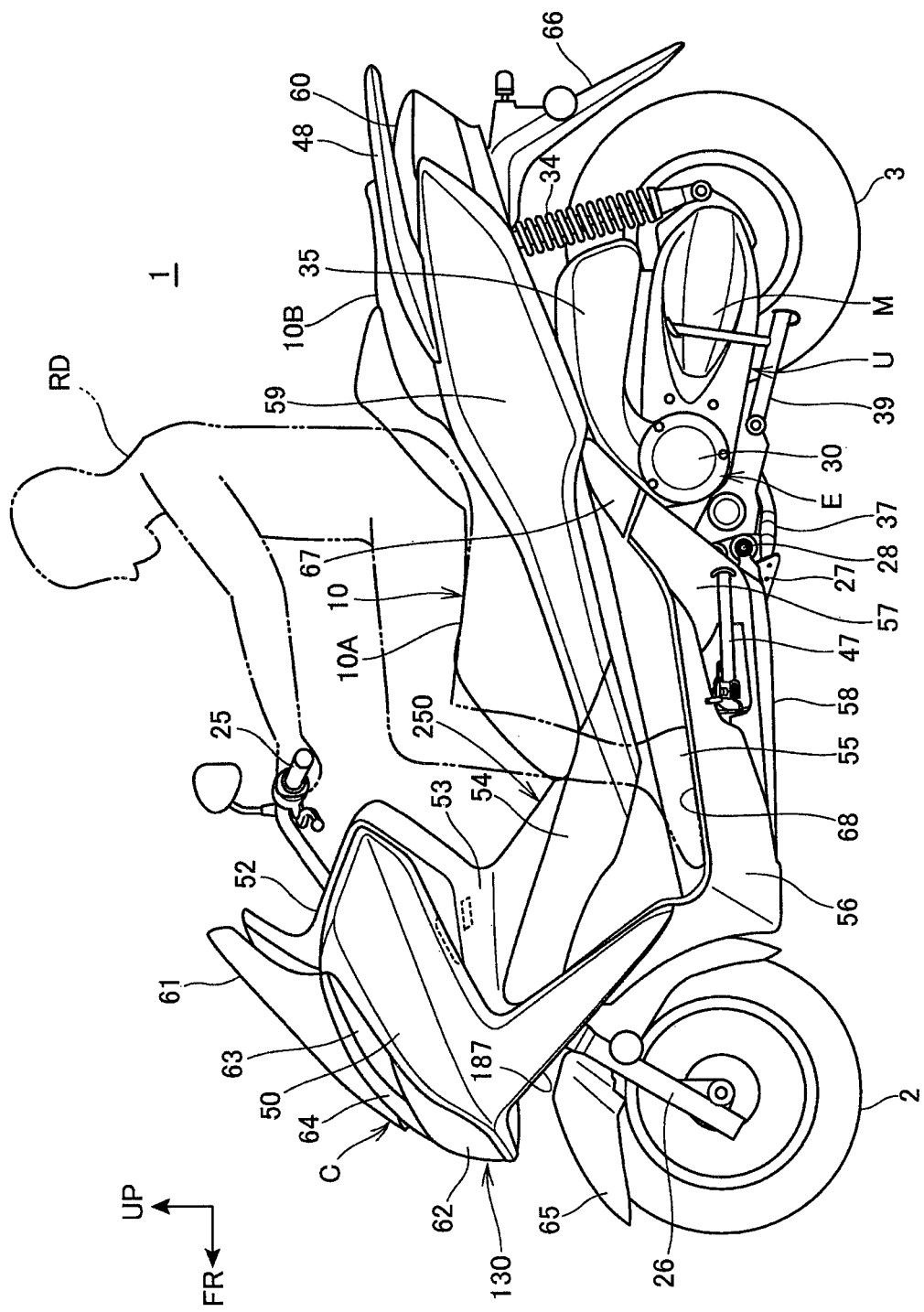
FIG. 1 is a left side elevational view of a motorcycle according to an embodiment of the present invention.

In the following, an embodiment of the present invention is described with reference to the drawings. It is to be noted that, in the following description, unless otherwise specified, representations of directions such as forward, rearward, leftward, rightward, upward and downward directions are the same as those with respect to a vehicle body. Further, in the figures, a reference character FR indicates the vehicle body forward direction, UP the vehicle body upward direction, and LE the vehicle body leftward direction.

Figure 2:
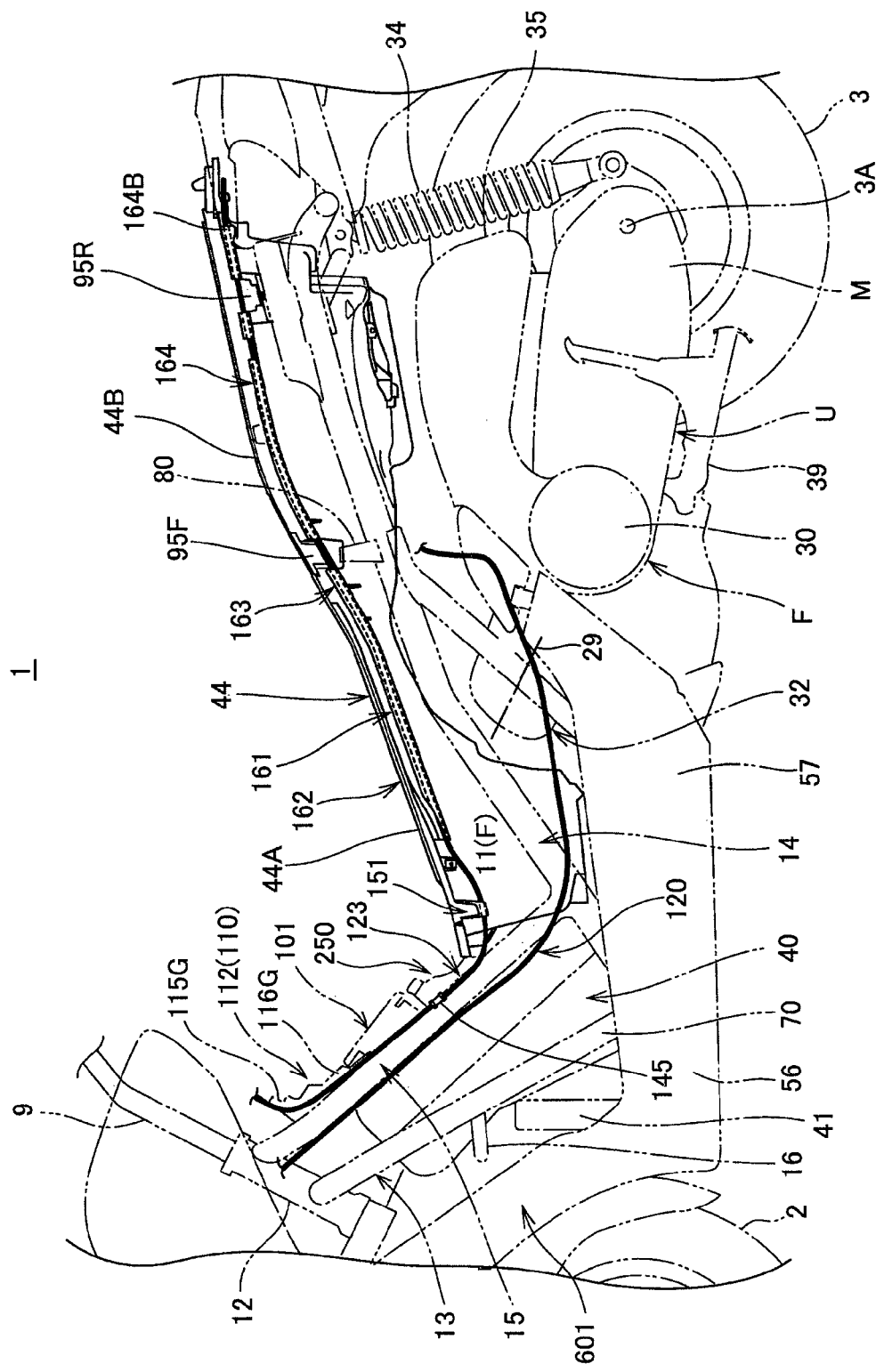
FIG. 2 is a view of an internal structure of the motorcycle as viewed from the left side.
Figure 3:
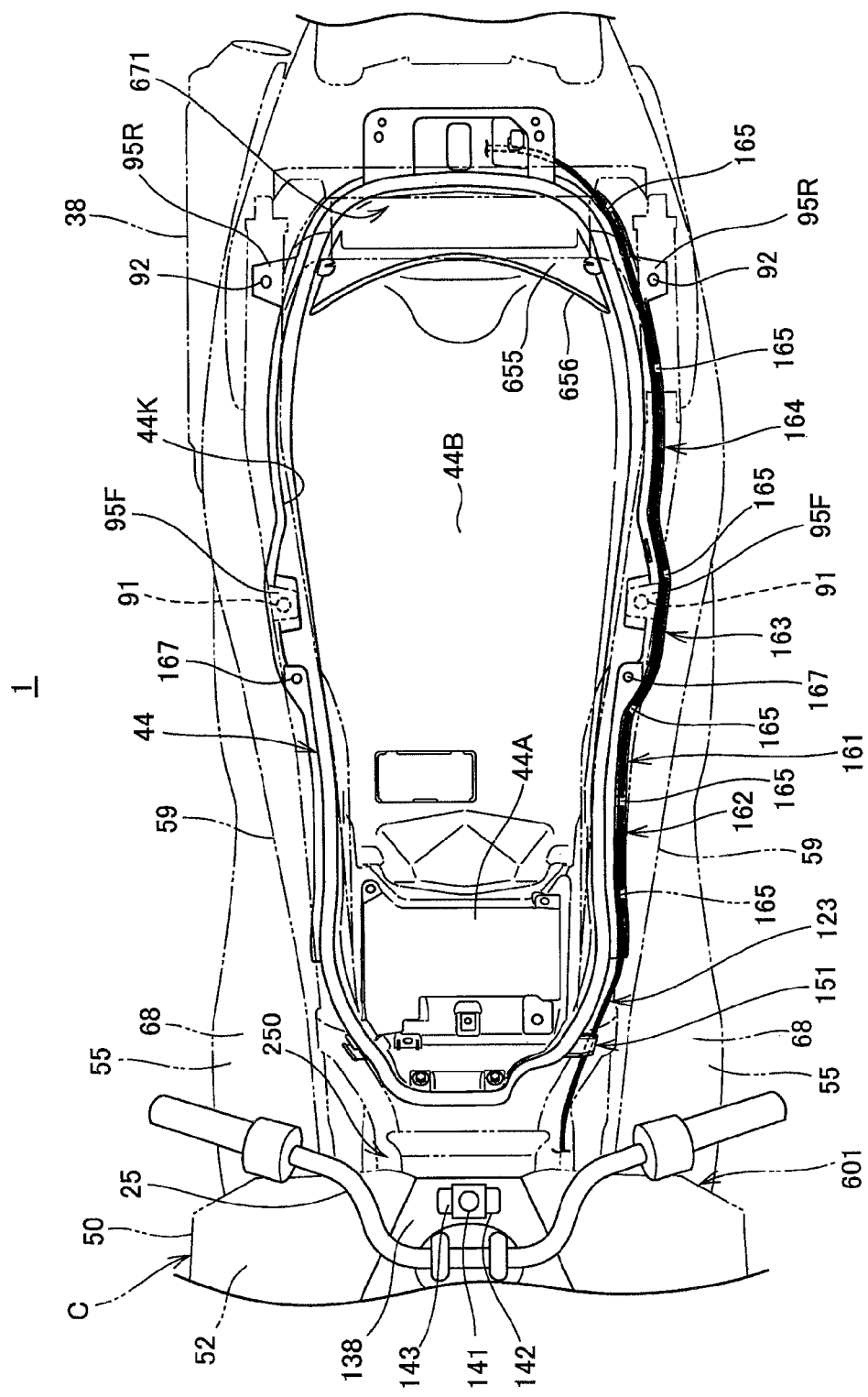
FIG. 3 is a view of the internal structure of the motorcycle of FIG. 2 as viewed from above.

As illustrated in FIGS. 1 to 3, the motorcycle (saddle type vehicle) 1 is a scooter type vehicle having a step floor 68 of the low floor type on which an occupant (rider) seated on a seat 10 places his or her feet. The motorcycle 1 includes a front wheel 2 at a front portion of a vehicle body frame F (FIG. 2) with a rear wheel 3 that is a driving wheel supported for rotation on a unit swing engine (also called swing power unit) U disposed at a rear portion of the vehicle. The vehicle body frame F is covered with a vehicle body cover C made of resin.

It is to be noted that, in FIG. 2, for the convenience of illustration, part of the vehicle body cover C is omitted and a throttle cable 120 and an operational cable 123 for the seat lock cancellation are indicated by thick lines.

Figure 4:
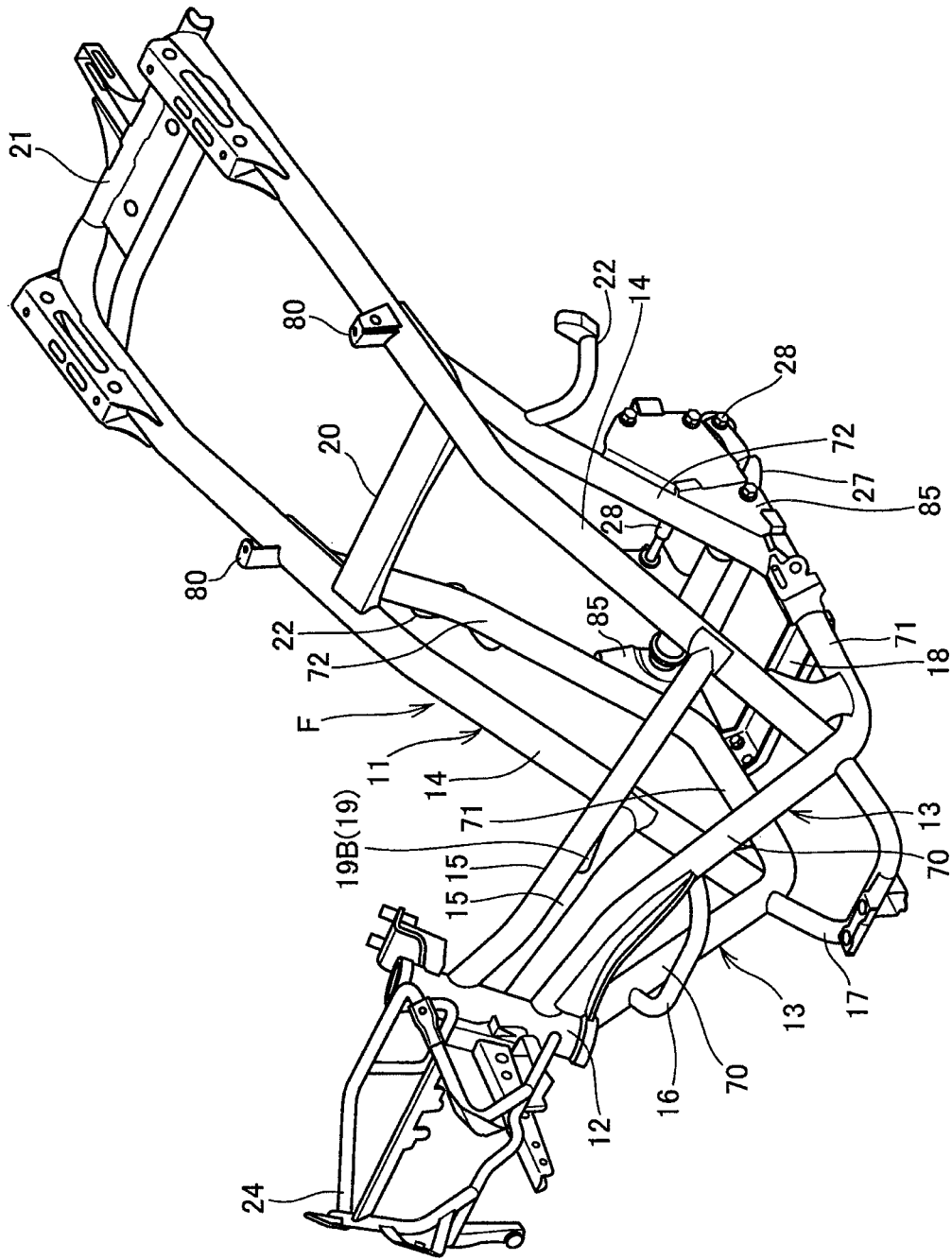
FIG. 4 is a perspective view of a vehicle body frame.

As shown in FIGS. 2 to 4, the vehicle body frame F is formed by connecting a plurality of tubes or pipes made of metal to each other by welding. A main frame 11 includes a head pipe 12 provided at a front portion, and a pair of left and right lower side down frames 13, 13 that extend rearwardly and downwardly from the head pipe 12, then extend substantially horizontally and rearwardly and further extend rearwardly and upwardly at a rear portion. The main frame 11 further includes a pair of left and right seat rails 14, 14 extending rearwardly and upwardly from a front lower portion of the lower side down frames 13, 13 to a rear portion of the vehicle. The main frame 11 further includes a pair of left and right upper side down frames (hereinafter referred to as upper frames) 15, 15 extending rearwardly and downwardly from the head pipe 12 above the lower side down frames 13, 13 and connected to the seat rails 14, 14.

Each of the lower side down frames 13, 13 has downwardly extending portions 70 connected at a front end portion thereof to the head pipe 12 and extending rearwardly and downwardly, and horizontally extending portions 71 extending rearwardly substantially horizontally from each of a lower end of the downwardly extending portions 70. Each of the lower side down frames 13, 13 further has obliquely upwardly extending portions 72 extending rearwardly and upwardly from each of a rear end of the horizontally extending portions 71.

As shown in FIG. 4, the main frame 11 includes, as cross members for connecting the left and right frames, a front upper cross member 16 connecting upper portions of the downwardly extending portions 70 of the lower side down frames 13, 13, and a front cross member 17 for connecting lower portions of the downwardly extending portions 70 to each other. The main frame 11 further includes a horizontal portion cross member 18 for connecting horizontally extending portions 71 of the lower side down frames 13, 13, to each other, and a pair of front and rear cross members 19 for connecting the upper frames 15, 15 to each other. The main frame 11 further includes an intermediate cross member 20 for connecting rear portions of the seat rails 14, 14, and a rear portion cross member 21 for connecting rear portions of the seat rails 14, 14 to each other. The horizontal portion cross member 18 is connected to the horizontally extending portions 71 by bolting.

The front and rear paired cross members 19 that connect the upper frames 15, to each other include an upper cross member 19A (refer to FIG. 7 hereinafter described) in the form of a plate for connecting upper portions of the upper frames 15, 15 to each other. The front and rear paired cross members 19 further include a lower cross member 19B (FIG. 4) having a cylindrical cross section for connecting lower portions of the upper frames 15, 15 to each other.

A pair of left and right tandem step stays 22, 22, extending outwardly in a vehicle widthwise direction, are provided at upper portions of the obliquely upwardly extending portions 72, 72 of the lower side down frames 13, 13.

On a front face of the head pipe 12, a front frame 24 is provided in the form of a basket for supporting lamps, the vehicle body cover C and so forth.

A steering system for steering the front wheel 2 includes a steering shaft 9 (FIG. 2) supported for rotation on the head pipe 12, and a handlebar 25 connected to an upper portion of the steering shaft 9. The steering shaft 9 is connected at a lower end thereof to a pair of left and right front forks 26, 26 (FIG. 1). The front wheel 2 is supported for rotation at a lower end of the front forks 26, 26 and is steered by operation of the handlebar 25.

The unit swing engine U is of the unit swing type wherein an engine E and a transmission case M in which a continuously variable transmission mechanism of the belt type is accommodated are integrated with each other, and has a function also as a swing arm for supporting the rear wheel 3 as shown in FIG. 1. The unit swing engine U is connected to a rear portion of the lower side down frames 13, 13 through a link member 27 connected to a front portion of the unit swing engine U and is upwardly and downwardly rockable around a pivot shaft 28 provided on the link member 27. It is to be noted that the link member 27 is connected at a front end thereof to a rear portion of the lower side down frames 13, 13 through a pair of left and right power unit supporting portions 85, 85 (FIG. 4).

The engine E is a four-cycle single cylinder engine of the water cooled type and is disposed such that a cylinder axial line 29 (FIG. 2) thereof extends forwardly substantially horizontally. The engine E is configured such that a cylinder section 32 (FIG. 2) formed from a cylinder block and a cylinder head is coupled to a front end of a crankcase 30 disposed at a front portion of the unit swing engine U.

The transmission case M extends rearwardly passing to the left and sidewardly of the rear wheel 3 from a rear portion of the crankcase 30, and an axle 3A (FIG. 2) of the rear wheel 3 is supported at a rear portion of the transmission case M. Output power of the engine F is transmitted to the rear wheel 3 through the continuously variable transmission mechanism in the transmission case M. A pair of left and right rear suspensions 34, 34 extend between a rear end of the transmission case M and a rear end of an arm portion 33 and the seat rails 14, 14.

An air cleaner box 35 (FIGS. 1 and 2) for sucking external air is provided on an upper face of the transmission case M. The air cleaner box 35 is connected to a throttle body not shown connected to an intake port of the cylinder section 32 through a connecting tube not shown. The throttle body is operated by a throttle cable 120 (FIG. 2) extending from a throttle provided on the handlebar 25 to adjust the throttle opening.

An exhaust pipe 37 connected to an exhaust port of the cylinder section 32 extends rearwardly passing below the engine E and is connected to a muffler 38 (FIG. 3) fixed to an outer side (right side) of the arm portion 33. A main stand 39 that can support the vehicle in an upright state is provided at a rear downward portion of the transmission case M.

A fuel tank 40 for reserving fuel for the engine E is formed in a shape wherein, as viewed in a side elevation, a front face thereof is inclined rearwardly and downwardly along the downwardly extending portions 70 of the lower side down frames 13 and a rear face thereof is inclined rearwardly and downwardly along the upper frames 15 as shown in FIG. 2. Meanwhile, in an upward and downward direction, the fuel tank 40 extends upwardly and downwardly long from behind a lower portion of the head pipe 12 to the proximity of the horizontally extending portions 71 of the lower side down frames 13. In short, the fuel tank 40 is formed in a tank inclined rearwardly and downwardly between the left and right lower side down frames 13, 13 and the upper frames 15.

In a space that is open downwardly of a front portion of the fuel tank 40, a plate-shaped radiator 41 for cooling the cooling water of the engine E is provided, and the radiator 41 and the fuel tank 40 are disposed compactly in the forward and rearward direction. Further, a side stand 47 (FIG. 1) that can support the vehicle in a leftwardly inclined state is attached to the vehicle body frame F.

A storage box 44 (FIGS. 2 and 3) of a large capacity that can accommodate articles therein is disposed behind the fuel tank 40.

Figure 5:
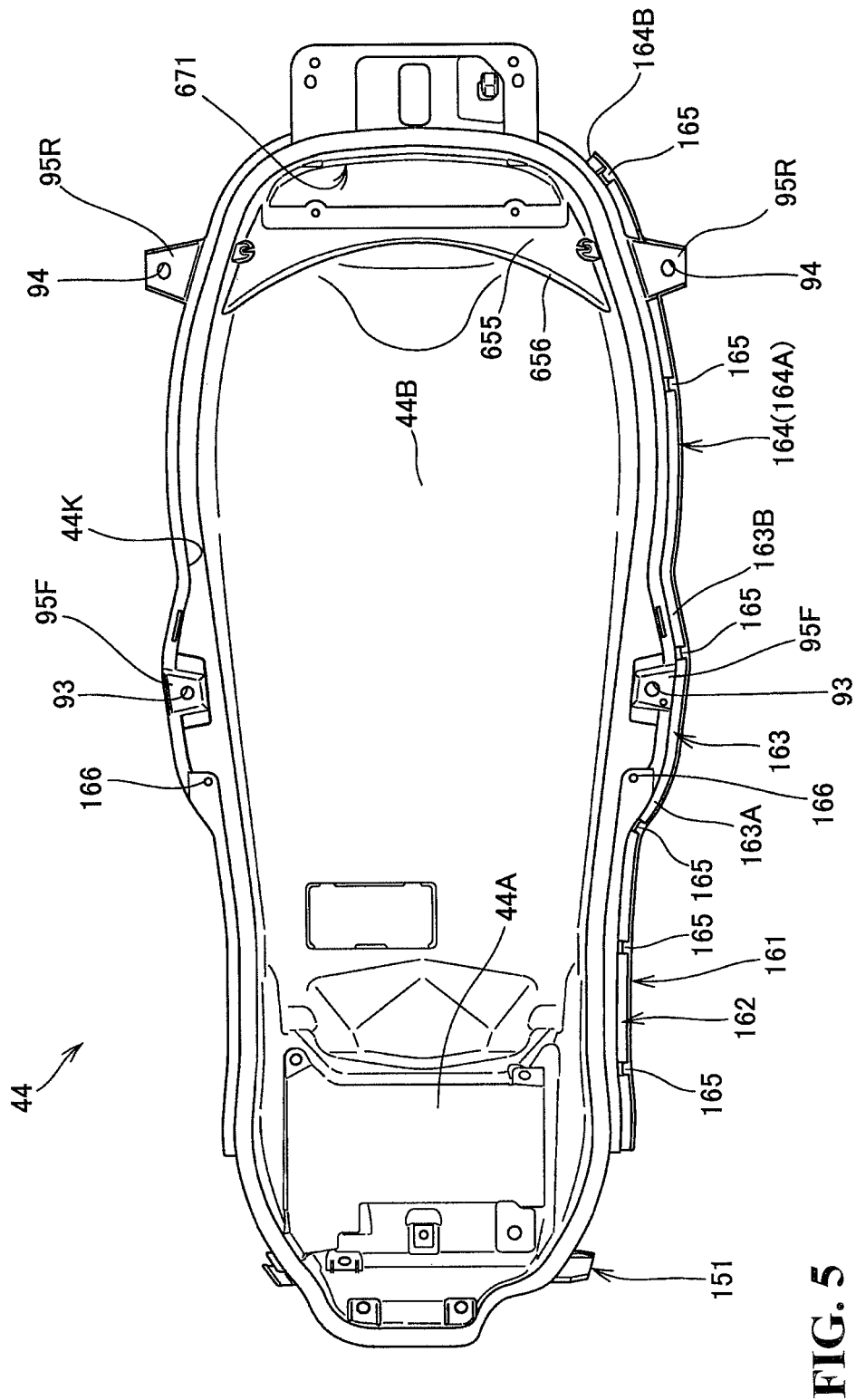
FIG. 5 is a view of a storage box as viewed from above.
Figure 6:
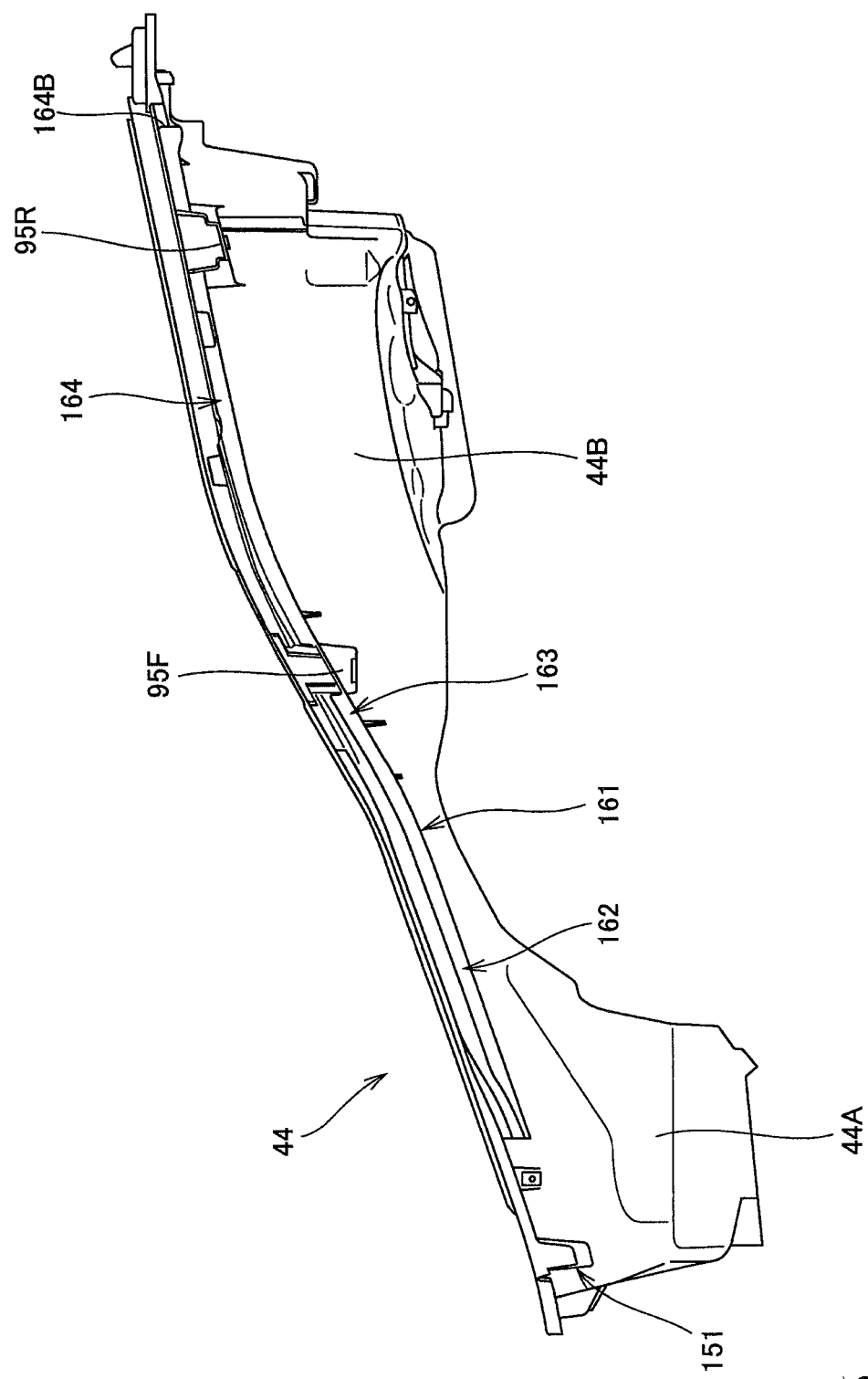
FIG. 6 is a view of the storage box as viewed from the left.

As illustrated in FIGS. 5 and 6, the storage box 44 is formed in a shape of a box that is long in the forward and rearward direction with respect to the width (length in the vehicle widthwise direction). The storage box 44 is connected to box stays 80, 80 (FIG. 4) provided at intermediate portions of the seat rails 14, 14 in the forward and rearward direction and rear portions of the seat rails 14, 14 by a plurality of fastening members 91 and 92 (FIG. 3). Since the storage box 44 is attached in this manner, the storage box 44 extends rearwardly and upwardly from the proximity of a rear portion of the fuel tank 40 to a location above the transmission case M between the seat rails 14, 14.

In FIG. 5, a pair of left and right through-holes 93 and 94 are provided through which the fastening members 91 and 92 extend, respectively. The through-holes 93 are provided in a pair of left and right projecting portions 95F, 95F that project to the left and to the right from an intermediate portion of the storage box 44 in the forward and rearward direction. The through-holes 94 are provided in a pair of left and right projecting portions 95R, 95R that project to the left and to the right from a rear portion of the storage box 44.

The left and right projecting portions 95F and 95R are portions projecting to the most outer sides of the storage box 44 in the vehicle widthwise direction. The projecting portions 95F and 95R are used as fixing portions to the vehicle body frame F so that the storage box 44 can be supported stably on the vehicle body frame F.

The storage box 44 has a front storage region 44A disposed between the fuel tank 40 and the obliquely upwardly extending portions 72 of the lower side down frames 13, and a rear storage region 44B disposed above the unit swing engine U. The front storage region 44A and the rear storage region 44B are formed integrally by resin molding.

An upper face of the storage box 44 has an opening 44K (FIG. 3) open over the overall length thereof. The opening 44K (FIG. 3) is closed up for opening by the seat 10 (FIG. 1) for an occupant. The seat 10 has a front seat 10A supported for upward and downward pivotal motion around a front end thereof on the vehicle body frame F for seating a rider (occupant RD shown in FIG. 1). The seat 10 further has a rear seat 10B formed higher by one step than the front seat 10A for seating a passenger. The front seat 10A and the rear seat 10B are formed integrally with each other.

A grab rail 48 (FIG. 1) is fixed to rear portions of the seat rails 14, 14 behind the storage box 44.

As shown in FIG. 1, the vehicle body cover C has a front cover 50 that covers the front and the left and right sides of the head pipe 12 and extends downwardly in front of the downwardly extending portions 70, and a front lower cover 51 connected to a lower portion of the front cover 50. The vehicle body cover C further has an upper cover 52 connected to an upper portion of the front cover 50 below the handlebar 25, and an upper inner cover 53 connected to left and right edge portions of the front cover 50 and covering the head pipe 12, upper frames 15, 15 and downwardly extending portions 70 from the rear and the sides. The vehicle body cover C further has a pair of left and right lower inner covers 54, 54 connected to a lower edge of the upper inner cover 53 and covering the upper frames 15, 15 and the downwardly extending portions 70, and a pair of left and right step covers 55, 55 connected to a lower portion of the front cover 50 and lower edges of the lower inner covers 54, 54. The vehicle body cover C further has a pair of left and right front floor skirts 56, 56 connected to a lower portion of the front cover 50 and lower portions of the step covers 55, 55 and covering step frames 23, 23 from the sides, and a pair of left and right rear floor skirts 57, 57 continuing to and extending rearwardly from the front floor skirts 56, 56 and covering the lower side down frames 13, 13. The vehicle body cover C further has an undercover 58 covering the left and right horizontally extending portions 71, 71 from below, a pair of left and right body side covers 59, 59 connected to rear portions of the lower inner covers 54, 54 and the step covers 55, 55 for covering the storage box 44 and the seat rails 14, 14 from the sides below the seat 10. A tail cover 60 is connected to rear portions of the body side covers 59, 59.

A step floor 68 on which the occupant RD seated on the front seat 10A places his or her feet is formed on a bottom portion of each of the left and right step covers 55, 55.

The upper inner cover 53, lower inner covers 54, 54 and step covers 55, 55 are parts that form a center tunnel section 250 disposed below a location between the handlebar 25 and the seat 10.

The center tunnel section 250 connects a lower portion of the seat 10 and a leg shield 601, that covers the feet of the occupant RD from the front to each other in such a manner so as to cover the left and right paired upper frames 15, 15, that are disposed at a position higher than the left and right step floors 68, and the fuel tank 40 from above.

Of the center tunnel section 250, a portion adjacent the leg shield 601, namely, a straddle section 250A configured from the upper inner cover 53 and the lower inner covers 54, 54, is inclined so as to approach the center side of the vehicle width toward the rear, thereby facilitating an improvement in getting on the vehicle.

A windshield 61 extending rearwardly and upwardly is provided at a front portion of the front cover 50. A headlamp 62 is provided at a front end of the front cover 50, and a pair of left and right blinkers 63 are provided continuously at an upper portion of the headlamp 62. A garnish 64 in the form of a plate is provided between the headlamp 62 and the windshield 61.

A front fender 65 that covers the front wheel 2 from above is provided on the front forks 26, 26. An open portion 187 wherein the front wheel 2 is disposed is formed between an upper portion of the front lower cover 51 and the front cover 50 above the front fender 65. The steering system extends upwardly and downwardly through the open portion 187.

A rear fender 66 for covering the rear wheel 3 from above is provided below the body side covers 59, 59.

A pair of retractable tandem steps 67 on which a passenger on the rear seat 10B places his or her feet are supported on the tandem step stays 22, 22 (FIG. 4).

A front cover 130 that serves as a front cowl for covering a portion in the proximity of the head pipe 12 (front portion of the vehicle) is configured from the front cover 50, upper cover 52 and upper inner cover 53 described above.

As shown in FIG. 3, a region on the back of a central portion of the handlebar 25 is covered with a center panel 138. A key cylinder portion 141 that can change over an ignition switch of the vehicle by being operated by a main key and a pair of left and right operational elements 142 and 143 of the depression type are provided on the center panel 138. An operational cable (pipe) is connected at one end thereof to each of the operational elements 142 and 143 such that it is pulled in response to an operation of the operational element 142 or 143 to unlock a lid portion 134 of an article storage section 132 and cancel a seat lock hereinafter described through the operational elements 142 and 143. In other words, the operational elements 142 and 143 configure a lock cancellation apparatus for the article storage section at a front portion of the vehicle and a seat lock cancellation operation.

Figure 7:
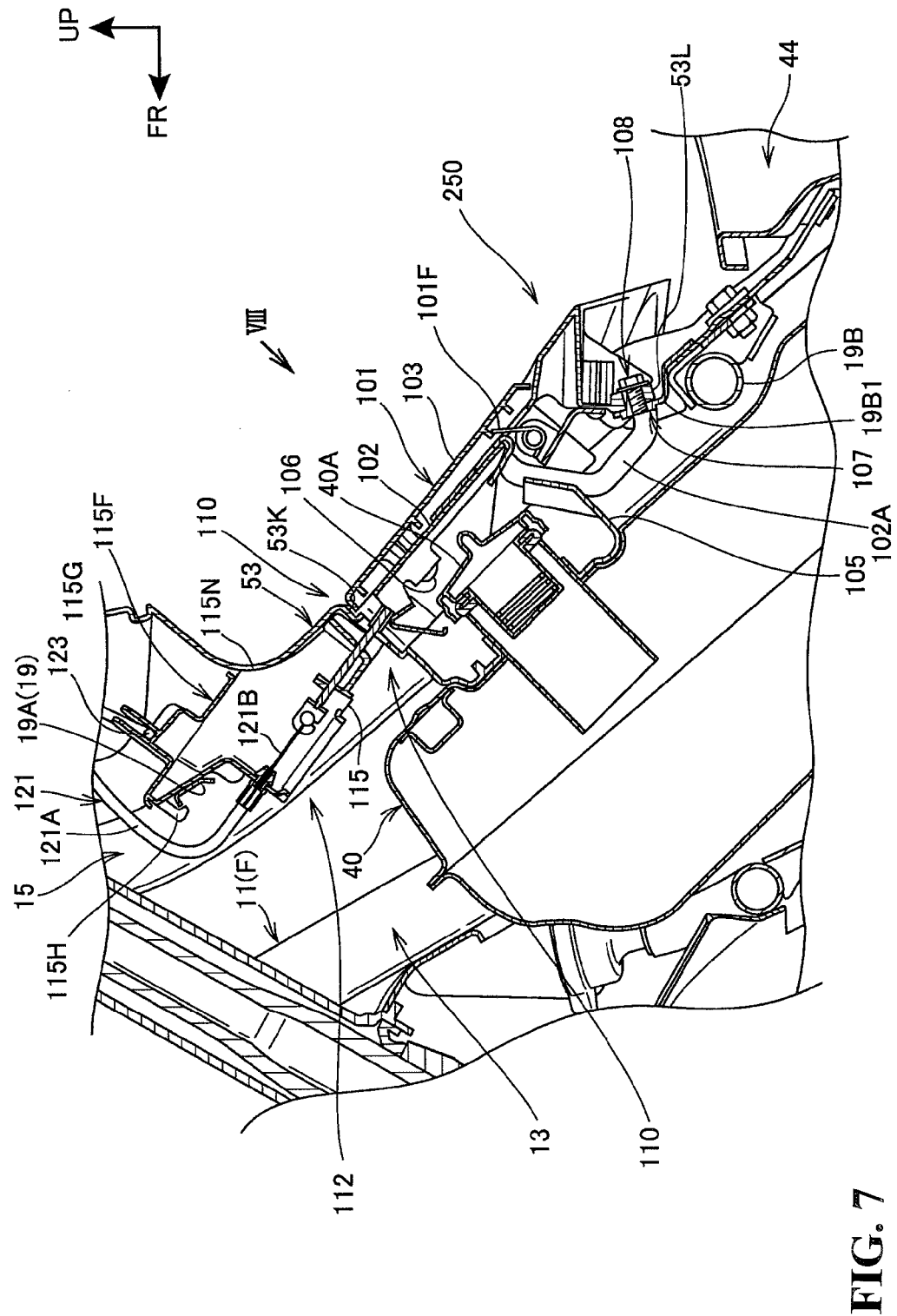
FIG. 7 is a side elevational sectional view showing a fuel tank together with a peripheral structure.
Figure 8:
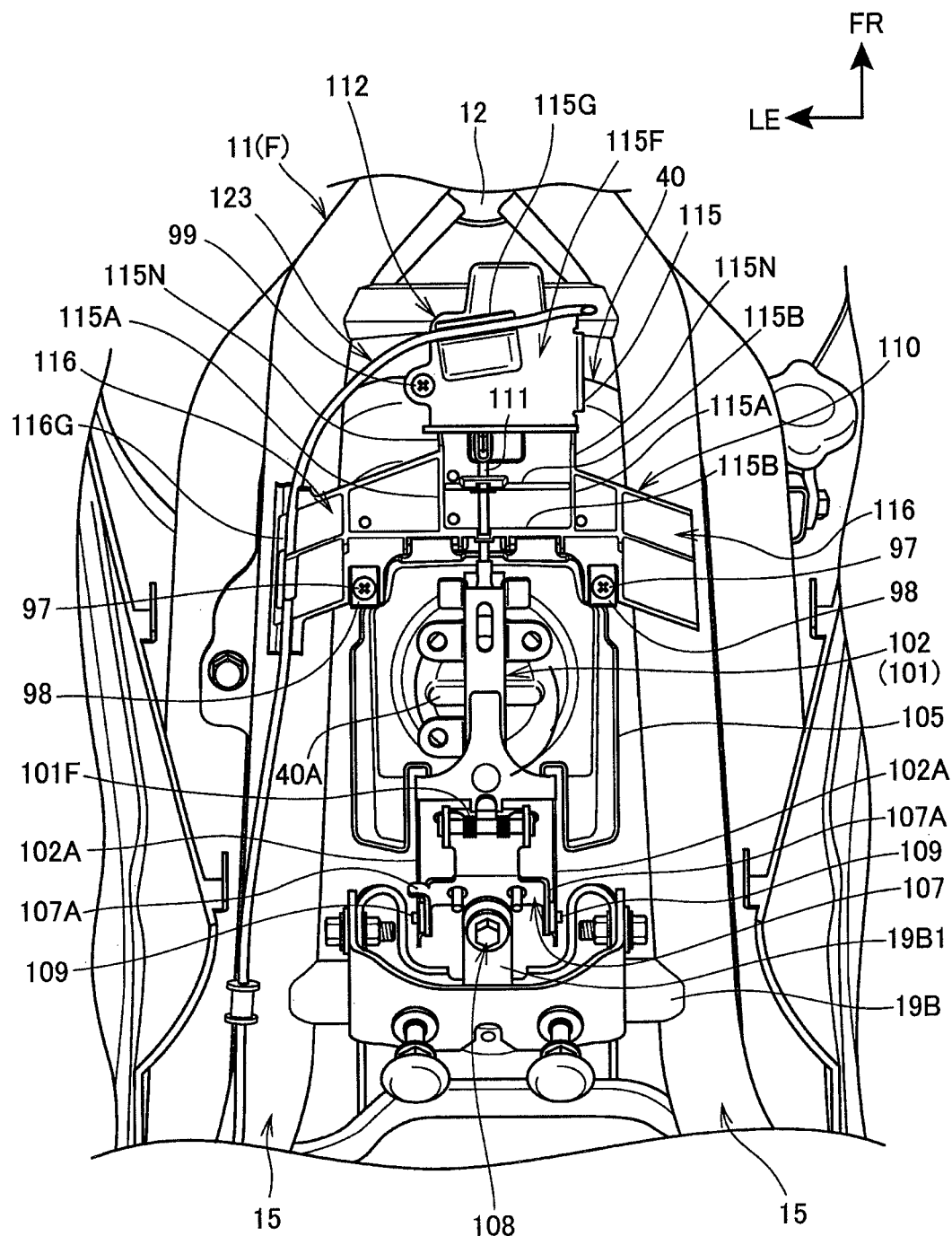
FIG. 8 is a view indicated by an arrow mark VIII in FIG. 7.
Figure 9:
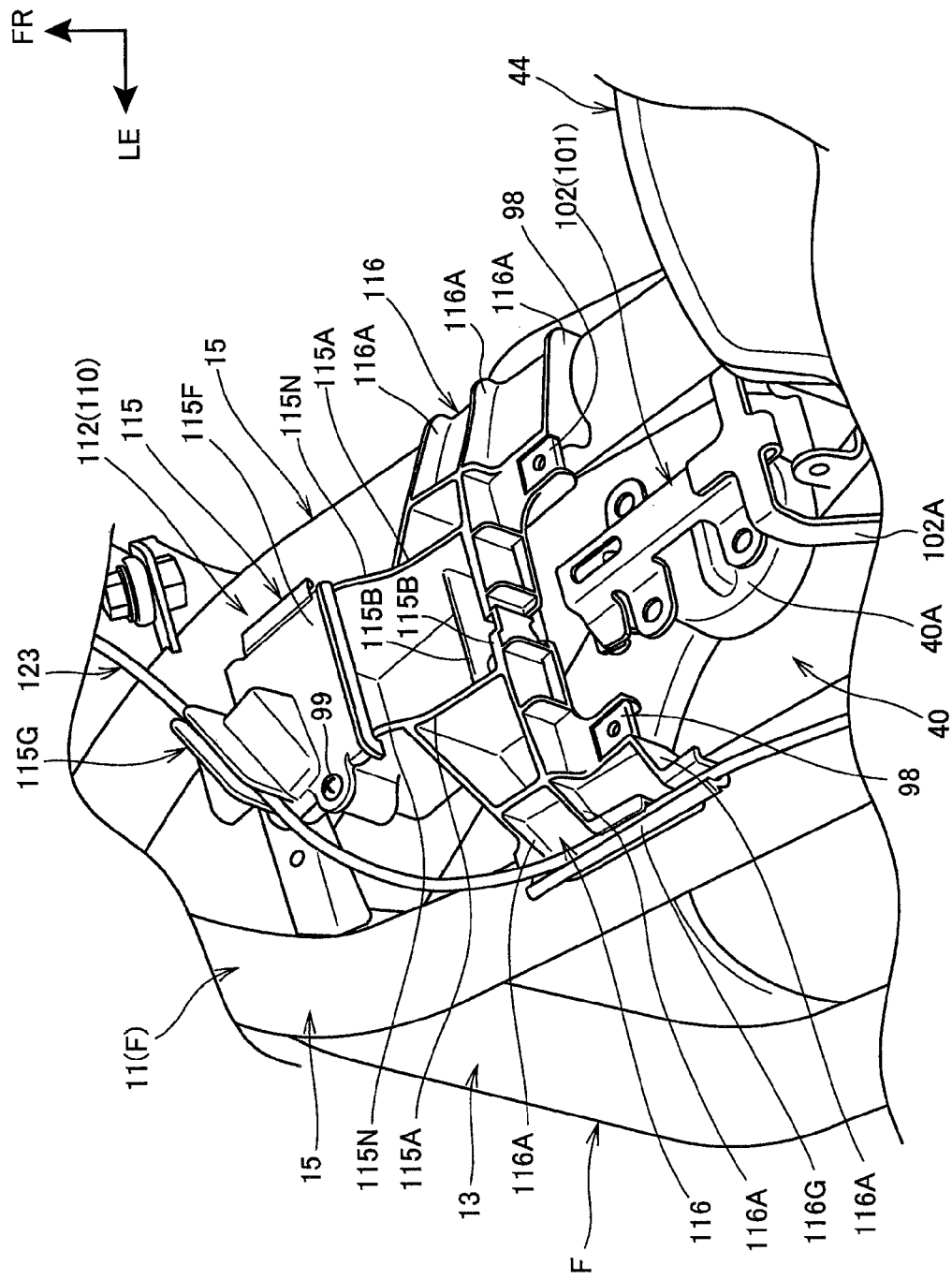
FIG. 9 is a perspective view of the fuel tank and the peripheral structure shown in FIG. 8.

FIGS. 7 to 9 illustrate the fuel tank 40 together with a peripheral structure. It is to be noted that FIGS. 8 and 9 show the fuel tank and the peripheral structure with the vehicle body cover C removed.

As shown in FIG. 7, an opening 53K for allowing a filler cap 40A provided at an upper portion of the fuel tank 40 to be exposed outwardly therethrough is provided in a region of the upper inner cover 53 corresponding to the center tunnel section 250. The opening 53K is opened and closed by a fuel lid (hereinafter referred to as lid) 101 that functions as a lid member.

Figure 10:
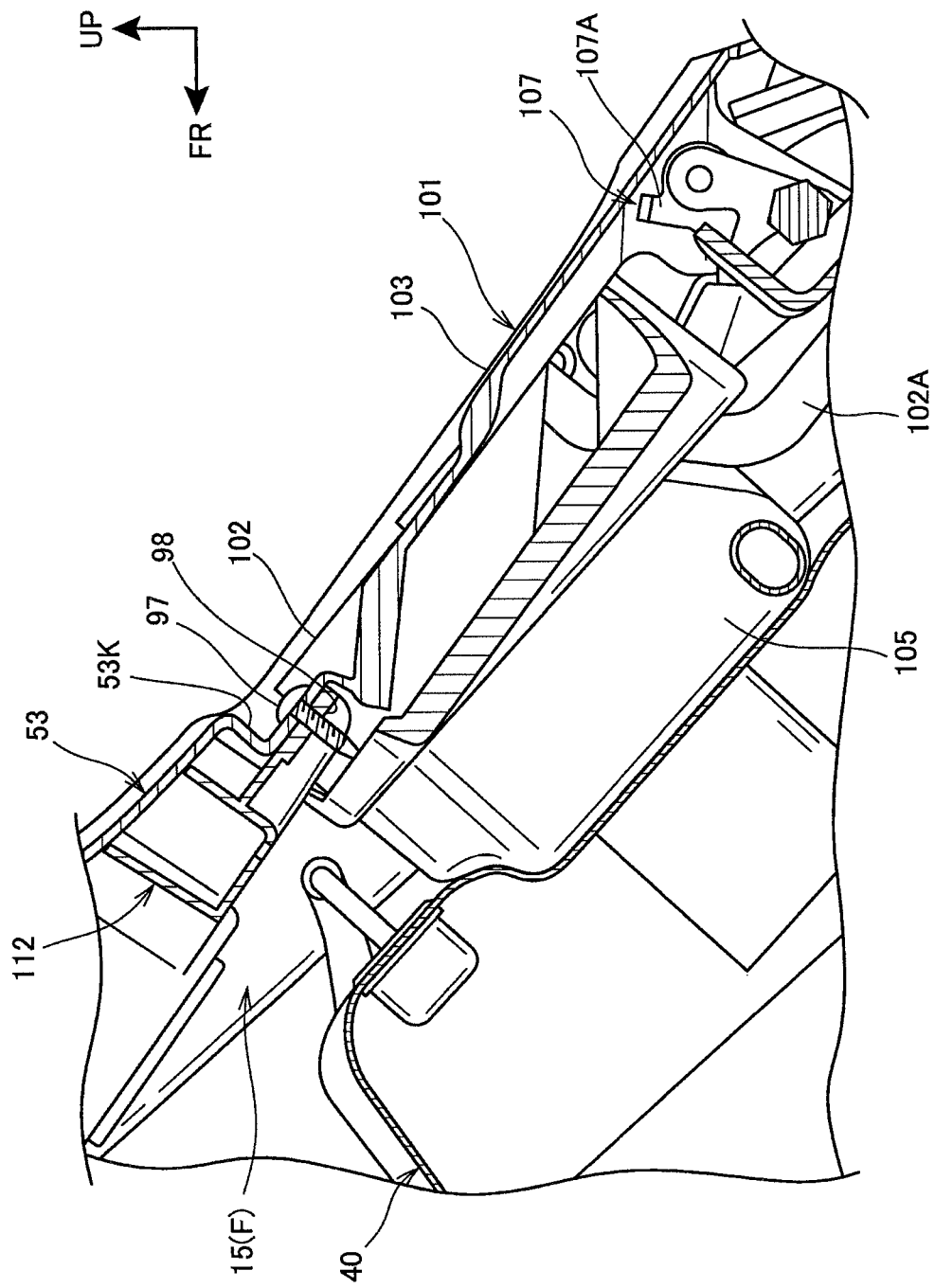
FIG. 10 is a view showing a lid in a closed state in a cross section different from that of FIG. 7.

FIG. 10 is a view showing the lid 101 in a closed state in a cross section different from that of FIG. 7.

As illustrated in FIGS. 7 to 10 a lid main body 102 is made of metal and movable to close and open the opening 53K. A lid cover 103 that can open and close the opening 53K is mounted on the lid main body 102. Further, in FIGS. 7 and 10, an enclosure cover 105 is illustrated that encloses the periphery of the filler neck of the fuel tank 40. The enclosure cover 105 is formed in a shape of a box that is open upwardly, and surrounds the periphery of the filler neck including the filler cap 40A such that the upper opening of the enclosure cover 105 is in communication with the opening 53K.

Figure 11:
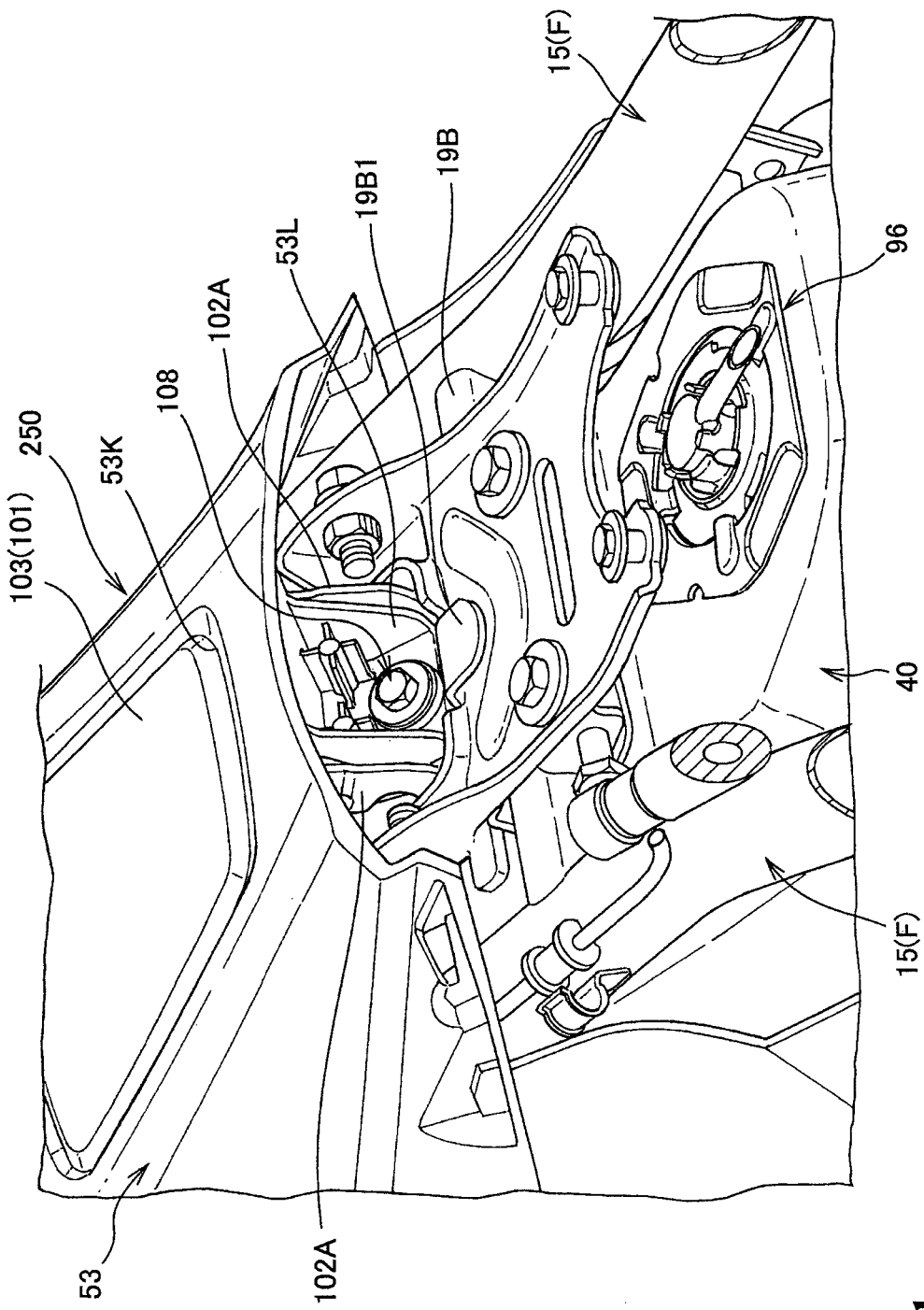
FIG. 11 is a perspective view showing a rear portion of a lid main body together with a peripheral configuration.

FIG. 11 is a perspective view showing a rear portion of the lid main body 102 together with a peripheral configuration. It is to be noted that, in FIG. 11, a fuel pump 96 is provided rearwardly and downwardly of the lid 101 of the fuel tank 40.

As shown in FIGS. 7, 8 and 11, a stay 19B1 made of metal and extending forwardly and upwardly from the center in the vehicle widthwise direction is joined by welding or the like to the lower cross member 19B that connects lower portions of the left and right paired lower side down frames 13, 13 to each other. To the stay 19B1, a lid bracket 107 (FIGS. 7 and 8) that supports the lid main body 102 for opening and closing movement and the upper inner cover 53 that configures part of the vehicle body cover C are fastened together by a single fastening member 108.

As shown in FIG. 8, the lid bracket 107 has a pair of left and right supporting plate portions 107A projecting to the left and to the right from the stay 19B1 and bent and standing upwardly from the opposite sides of the stay 19B1. A pair of left and right lid arms 102A, 102A extending from the lid main body 102 are connected for pivotal motion on the left and right paired supporting plate portions 107A through support shafts 109, 109 juxtaposed coaxially with each other. In other words, the lid bracket 107 functions as an opening and closing mechanism for supporting the lid 101 for opening and closing motion.

Figure 12:
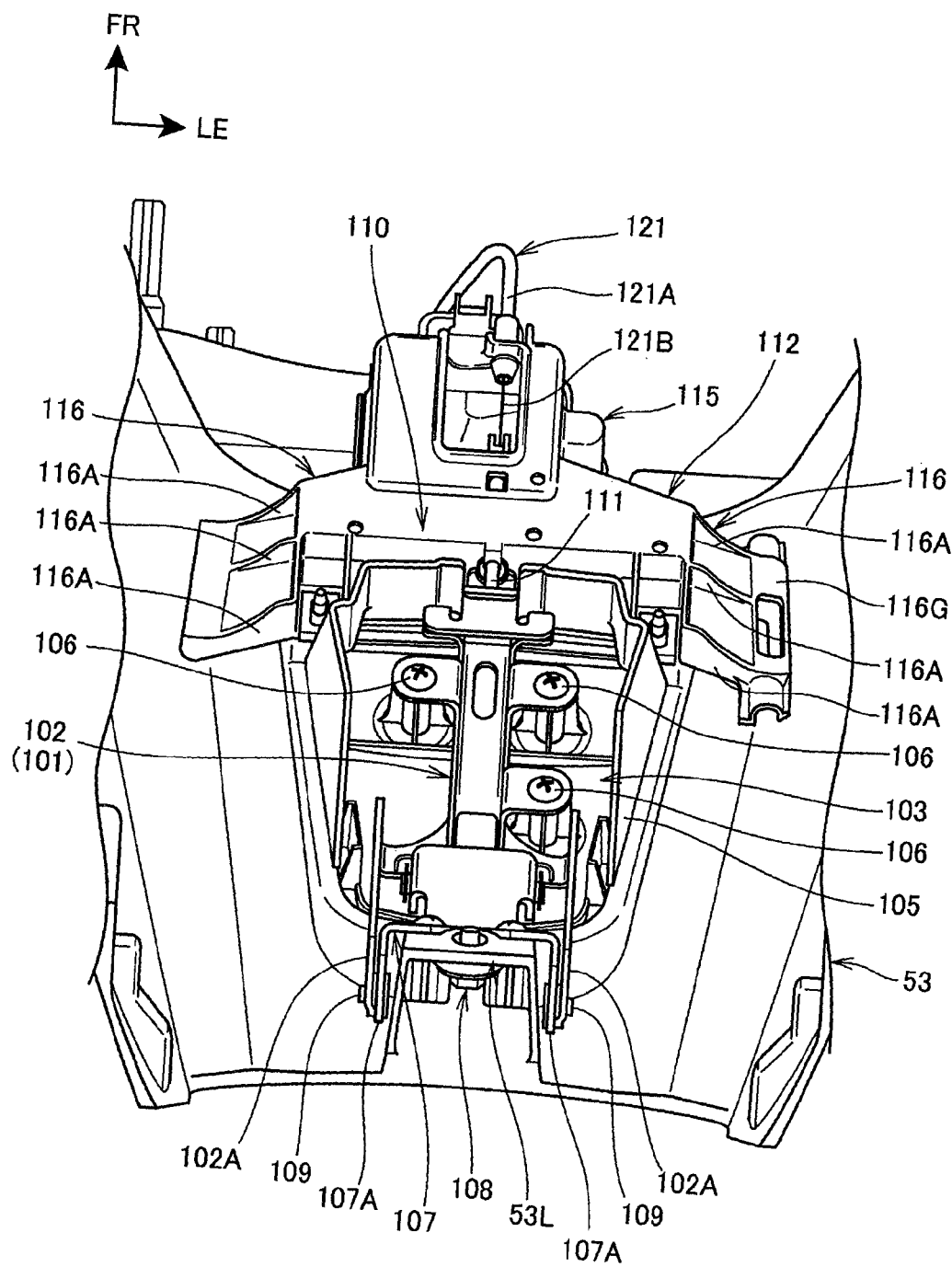
FIG. 12 is a view of the lid main body from the rear side together with a peripheral configuration.

FIG. 12 shows a view of the lid main body 102 together with a peripheral configuration as viewed from the rear side.

As shown in FIG. 12, the lid cover 103 is fixed to the lid main body 102 using a plurality of (in the present configuration, three) fastening members 106.

The upper inner cover 53 has a lower projection 53L projecting downwardly at a rear end portion at the center in the vehicle widthwise direction. The lower projection 53L is placed on the lid bracket 107. In this state, the single fastening member 108 is fastened from above to the lid bracket 107 through the lower projection 53L. Consequently, the lid bracket 107 and the upper inner cover 53 are fastened together.

Since the lid 101 is fixed to the upper inner cover 53 and the vehicle body frame F through the lid bracket 107 in this manner, the lid 101 can be positioned accurately on the upper inner cover 53. Thus, the accuracy of assembly can be improved. Consequently, the gap between the lid cover 103 and the opening 53K of the upper inner cover 53 can be minimized to assemble the lid 101 and the upper inner cover 53 with a high accuracy.

Further, since the lid 101 and the upper inner cover 53 are fixed to the vehicle body frame F, the number of parts can be reduced as compared to when the parts are fixed separately from each other. Thus, improvement in productivity, reduction in weight and reduction in space can be anticipated.

Further, the lid 101 is configured such that it is biased to the opening side by a biasing member 101F (FIGS. 7 and 8) supported on the lid bracket 107. Thus, the lid 101 can be held in a closed state by a lid lock mechanism 110 (FIG. 8 and so forth) that can lock the lid 101 in the closed state.

Therefore, by canceling the lock by the lid lock mechanism 110, the lid 101 is opened automatically, and the necessity for an operation of the occupant RD to directly pull the lid 101 is eliminated.

Now, the lid lock mechanism 110 is described.

Figure 13:
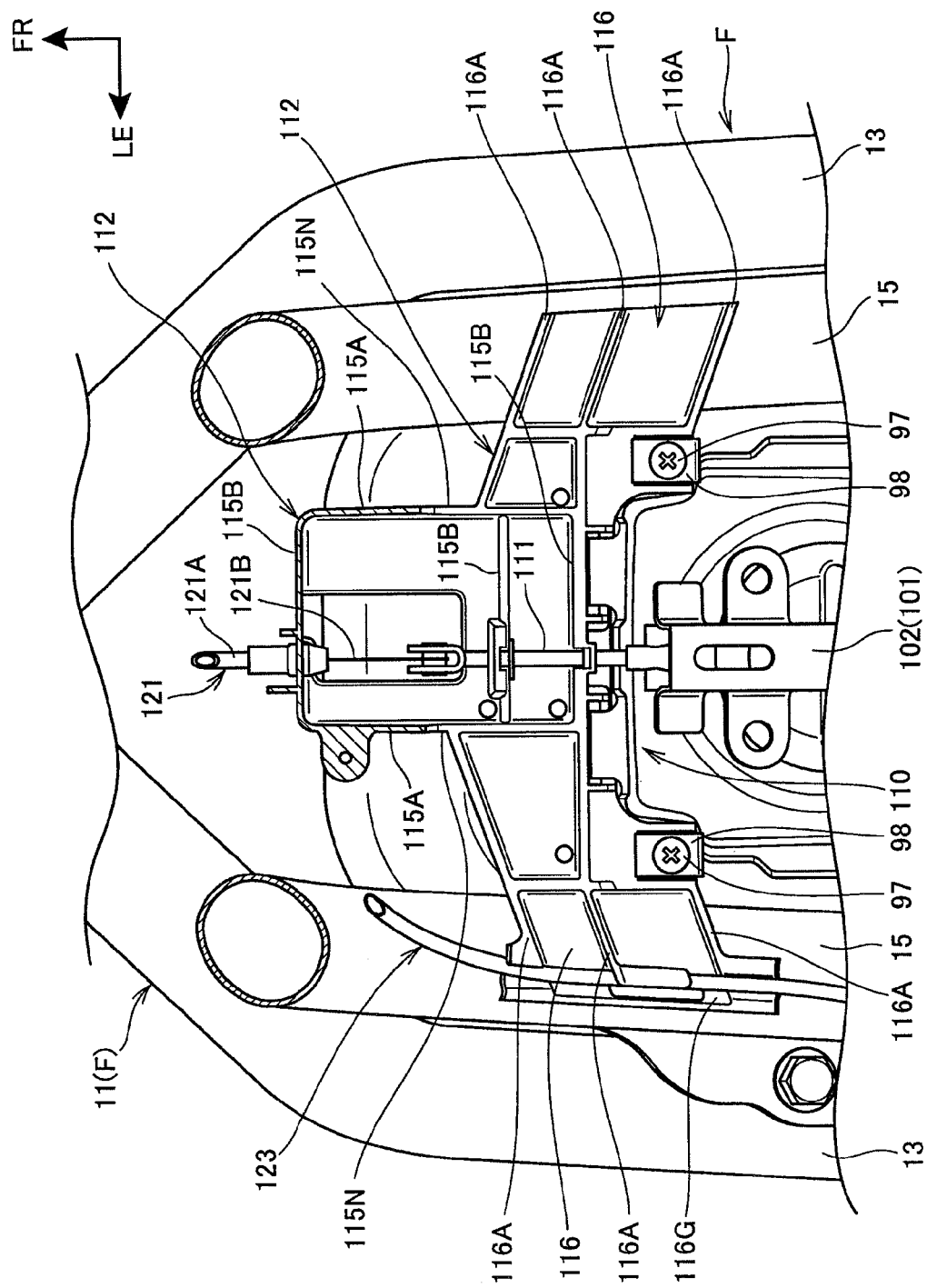
FIG. 13 is an enlarged view of a peripheral portion of a lid lock mechanism of FIG. 8.
Figure 14:
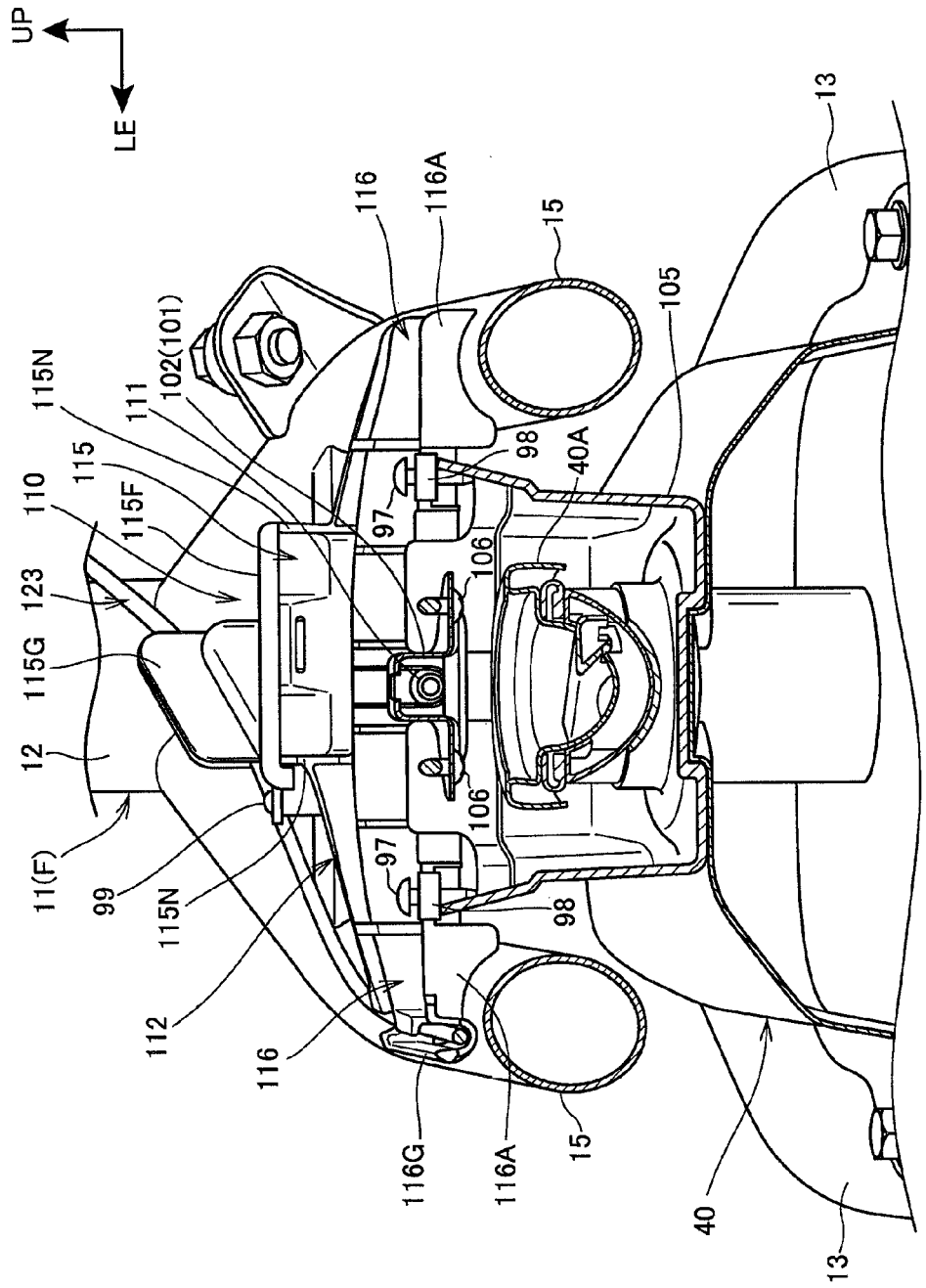
FIG. 14 is a view of the lid lock mechanism as viewed from the rear.

FIG. 13 is an enlarged view of a region around the lid lock mechanism 110 of FIG. 8. FIG. 14 is a sectional view of the lid lock mechanism 110 as viewed from the back.

As shown in FIGS. 13 and 14, the lid lock mechanism 110 includes a single lock rod 111 that moves toward the lid main body 102 and is a mechanism that inhibits the opening movement of the lid 101 by locking the lock rod 111 to the lid main body 102. The lock rod 111 is supported on a lock member 112 disposed forwardly and upwardly of the lid 101.

The lock member 112 is a resin part formed by the integral molding of resin material. The lock member 112 has a rod supporting portion 115 for supporting the lock rod 111 and a pair of left and right foot portions 116, 116 extending to the left and the right from the rod supporting portion 115 and placed on the paired left and right upper frames 15, 15. The rod supporting portion 115 and the foot portions 116, 116 are provided integrally with each other. Fastening portions 98, 98 for fastening the upper inner cover 53 by a pair of left and right fastening members 97, 97 (FIGS. 8 and 10) are provided at base end portions of the foot portions 116, 116.

The rod supporting portion 115 has a pair of left and right longitudinal walls 115A, 115A extending in the forward and rearward direction on the opposite sides of a base member in the form of a substantially flat plate. The rod supporting portion 115 further has a plurality of (in the present configuration, three) partition walls (hereinafter referred to as lateral walls) 115B that extend in the vehicle widthwise direction in a spaced relationship from each other in the forward and rearward direction between the longitudinal walls 115A, 115A. The lock rod 111 extends through the paired front and rear lateral walls 115B to support the lock rod 111 for movement in the axial direction. In short, the rod supporting portion 115 functions as a guide member for the lock rod 111.

Since the walls 115A and 116E of the rod supporting portion 115 function also as reinforcing ribs, the rod supporting portion 115 can be formed as a part that is light in weight and has a sufficient rigidity.

In the motorcycle 1, the lock rod 111 is provided at a position at the center in the vehicle widthwise direction in the center tunnel section 250 (FIG. 14) and is disposed in a rearwardly and downwardly inclined state along the slope of the center tunnel section 250 (FIG. 7). Therefore, the lock rod 111 can be disposed making efficient use of an upper space in the inside of the center tunnel section 250.

In this instance, the lock rod 111 is guided for linear movement in the axial direction thereof by the rod supporting portion 115. As an end (rear end) of the lock rod 111 enters an opening that is open at the front end (front upper end) of the lid main body 102, movement of the lid main body 102 to the opening side can be restricted by the lock rod 111.

It is to be noted that the lock rod 111 is biased to the lid main body side (lock side) by a biasing member not shown and can be kept in a state wherein the lid 101 is closed.

As shown in FIG. 7, an operational cable (pipe) 121 that is pulled in response to an operation of a predetermined operational element (in the present configuration, an operational element 143 (FIG. 3)), that is operated by the occupant RD, is connected at one end thereof to a base end portion of the lock rod 111 positioned at a front upper end of the lock rod 111.

The operational cable 121 has a wire cable structure wherein an inner cable (sliding article) 121B slidably moves in the inside of an outer cable 121A that configures an outer tube. The outer cable 121A is connected at an end thereof to the lateral wall 115B at a frontmost end of the rod supporting portion 115 that configures a front wall of the rod supporting portion 115, and the inner cable 121B is fixed at an end thereof to the lock rod 111. Therefore, if the inner cable 121B is pulled by a predetermined operation of the occupant RD, then the lock rod 111 is pulled out forwardly and upwardly. Thus, the lock of the lid 101 of the fuel tank 40 can be canceled.

In the present configuration, since the operational cable 121 is disposed linearly on an extension of the axial line of the lock rod 111 in the proximity of the lock rod 111, the lock rod 111 works smoothly. Thus, the sense of working of the lock rod 111 can be improved.

Further, as shown in FIG. 9, the lid member 115F that covers from above is fixed integrally to the rod supporting portion 115 by a fastening member 99. On the lid member 115F, a first cable guide portion 115G for guiding the cable 123 for the seat lock cancellation that is a cable other than the lid locking cable is provided integrally.

Further, as shown in FIG. 7, a pawl portion (locking portion) 115H that extends downwardly and engages with the upper cross member 19A between the upper frames 15, 15 is formed integrally at a front lower portion of the rod supporting portion 115.

As shown in FIG. 8, the left and right paired foot portions 116, 116 are formed in such a shape that they extend to the left and to the right along an upper edge of the enclosure cover 105, that encloses the periphery of the filler neck (filler cap 40A), and extend to the left and to the right between the left and right upper frames 15, 15 as shown in FIG. 9. The foot portions 116, 116 have a plurality of (three in the rearward and downward direction) lateral walls 116A projecting downwardly as shown in FIGS. 9 and 12. Lower faces of the lateral walls 116A are formed in a curved shape wherein the lateral walls 116A are curved along outer peripheral faces of the upper frames 15, 15.

Therefore, by placing the lateral walls 116A of the foot portions 116, 116 on the upper frames 15, 15, the lock member 112 can be positioned in the vehicle widthwise direction. In this instance, the center in the vehicle widthwise direction and the center of the lock member 112 in the widthwise direction coincide with each other. Thus, the lock rod 111 can be positioned readily to a position wherein the lid 101 can be positioned for locking.

Also in the foot portions 116, 116, since the lateral walls 116A and the left and right paired longitudinal walls 115A, 115A function as reinforcing ribs similarly to the rod supporting portion 115, they can be formed as parts that are light in weight and have sufficient rigidity.

Since the lock member 112 has the pawl portion 115H (FIG. 7) that extends downwardly from a front upper end of the lock member 112 and is locked with the upper cross member 19A between the upper frames 15, 15 as described hereinabove, the pawl portion 115H can be locked with the upper cross member 19A to temporarily lock the lock member 112 to the vehicle body frame F side.

Upon this temporary locking, the foot portions 116, 116 of the lock member 112 are placed on the upper frames 15, 15. In addition, the pawl portion 115H is locked with the upper cross member 19A. Consequently, the lock member 112 can be positioned accurately and readily at a planned attachment position thereof.

Thereafter, by placing the upper inner cover 53 above the lock member 112 and fastening the fastening members 97, 97 to the fastening portions 98, 98 provided on the lock member 112 from above the upper inner cover 53, the upper inner cover 53 and the lock member 112 are fastened to each other (refer to FIG. 10). Thus, the attachment of the lock member 112 is completed therewith.

In this instance, while the load of the lock member 112 is supported by the left and right paired upper frames 15, 15 of the vehicle body frame F, the lock member 112 can be fixed to the upper inner cover 53. Accordingly, while the assembly accuracy between the lock member 112 and the upper inner cover 53 is improved, the necessity for such strength as to support the lock member 112 on the upper inner cover 53 of the vehicle body cover C is eliminated. Therefore, a reduction in the weight of the upper inner cover 53 can be anticipated.

Further, with the present configuration, since the lock member 112 is fixed to the upper inner cover 53 wherein the lid 101 is fixed, an assembly error between the lock member 112 and the lid 101 can be suppressed. Also by this construction, the operability of the lock member 112 can be well maintained.

Furthermore, in the lock member 112, the left and right paired longitudinal walls 115A, 115A of the lock member 112 include curved portions 115N, 115N (FIGS. 7 and 9) that are curved substantially along a curved portion 53N of the upper inner cover 53 as viewed in a side elevation. The curved portions 115N, 115N function as abutting portions that abut with the curved portion 53N of the upper inner cover 53 when the lock member 112 is assembled. Therefore, by the abutment, the lock member 112 can be sandwiched between the upper inner cover 53 and the upper frames 15, 15.

The abutment position corresponds to a position wherein the lock member 112 is spaced from the location and is fixed to the upper inner cover 53 (fastening members 97, 97 and fastening portions 98, 98). Therefore, by the fixed location and the sandwiched position, the lock member 112 can be fixed at a plurality of locations spaced from each other. Thus, the supporting force of the lock member 112 can be efficiently improved.

Therefore, even if the rigidity of the upper inner cover 53 is reduced, the upper inner cover 53 can be supported on the frame through the lock member 112. Thus, the supporting strength of the upper inner cover 53 can be readily assured. Consequently, while the supporting strength of the lock member 112 is assured, a reduction in the weight by reducing the thickness of the upper inner cover 53 can be anticipated.

Further, since the lock member 112 is disposed at the center in the vehicle widthwise direction utilizing the space between the left and right paired upper frames 15, and the space between the upper frames 15, 15 and the upper inner cover 53, it can be disposed effectively utilizing the dead spaces of the motorcycle 1.

Furthermore, a second cable guide portion 116G for guiding the operational cable 123 for the cancellation of the seat lock is formed integrally on one of the left and right foot portions 116, 116 (in the present configuration, the foot portion 116 on the left side of the vehicle body). This second cable guide portion 116G has a shape of a gutter open upwardly and supports the operational cable 123 along one upper frames 15 (on the left side).

In short, the operational cable 123 is guided by the second cable guide portion 116G after it is guided by the first cable guide portion 115G provided at a front upper portion of the lock member 112. The operational cable 123 is routed, although hereinafter described in detail, rearwardly along a left side edge of the upper frame 15 on the left side and the storage box 44, and is connected to a seat lock apparatus 372 (refer to FIG. 15 hereinafter described) for the cancellation of the seat lock provided at a position corresponding to a rear end of the storage box 44.

Since the lock member 112 for locking the lid 101 is used also as a guide member for guiding the operational cable 123 for the cancellation of the seat lock, that is a cable other than the operational cable 121 for the lid lock, a reduction in the number of parts is possible.

As described above, according to the present embodiment, the lock member 112 that can lock the lid 101 to the closed state is fixed to the upper inner cover 53 that configures part of the vehicle body cover C and is placed on the upper frames 15, 15 that are the vehicle body frame F below the upper inner cover 53. Therefore, it is possible to attach the lock member 112 to the vehicle body cover C side to assure the positional accuracy between the vehicle body cover C and the lock member 112 and support the load of the lock member 112 by the vehicle body frame F. Thus, the attachment rigidity of the lock member 112 of the vehicle body cover C can be suppressed.

Accordingly, a reduction in the weight of the vehicle body cover C can be anticipated while the positional accuracy between the vehicle body cover C and the lock member 112 is assured.

Further, the lid bracket 107 that configures the opening and closing mechanism for supporting the lid 101 for an opening and closing movement is fastened together with the upper inner cover 53 that is the vehicle body cover C and the upper frames 15, 15 that are the vehicle body frame F. Therefore, the positional accuracy of the upper inner cover 53, the lock member 112, and the lid 101 can be improved. Thus, the management power upon assembly can be reduced to improve the quality.

Further, since the lock member 112 is fixed to the upper inner cover 53 after it is placed on the upper frames 15, 15, the upper inner cover 53 can be assembled in a state wherein the lock member 112 is assembled to the vehicle body frame F (upper frames 15, 15) in advance. Consequently, the productivity is improved.

Further, since the lock member 112 is placed in such a manner so as to extend between the left and right paired upper frames 15, 15 that configure part of the vehicle body frame F, the load of the lock member 112 can be well supported. Thus the positioning of the lock member 112 in the vehicle widthwise direction is facilitated. Consequently, positioning upon assembly of the lock member 112 and the vehicle body frame F is improved. Thus, the productivity is also improved.

Furthermore, the upper frames 15, 15 are inclined in the forward and rearward direction of the vehicle body and have the upper cross member 19A on the inclination upper side. In addition, the lock member 112 includes the pawl portion 115H that serves as a locking portion for locking the upper cross member 19A from above. Therefore, positioning of the lock member 112 in the forward and rearward direction can be carried out temporarily making use of the inclination of the vehicle body frame F and the upper cross member 19A. This arrangement also improves the productive.

Further, the first and second cable guide portions 115G and 116G that function as guide portions for guiding the operational cable 123 (in the present configuration, the cable for cancellation of the seat lock) other than that for the lid lock are provided on the lock member 112. Therefore, a different operational cable 123 can be assembled in a state wherein the lock member 112 is placed on the vehicle body frame F. Thus, the productivity is also improved. Further, since a guide part for exclusive use for the different operational cable 123 and welding of such guide part to the vehicle body frame F can be reduced. Thus, a reduction in the cost and in the weight can be anticipated.

Further, the curved portions 115N, 115N that serve as abutting portions wherein the upper inner cover 53 abuts from above are provided at locations of the lock member 112 different from the locations wherein the lock member 112 is fixed to the upper inner cover 53 (vehicle body cover C). Therefore, the lock member 112 can be sandwiched between the upper inner cover 53 and the upper frames 15, 15 (vehicle body frame F). In addition, even if the rigidity of the vehicle body cover C is reduced, the supporting strength of the vehicle body cover C can be readily assured through the lock member 112. Accordingly, both of the supporting strength of the vehicle body cover C and a reduction in the weight of the vehicle body cover C can be achieved.

Figure 15:
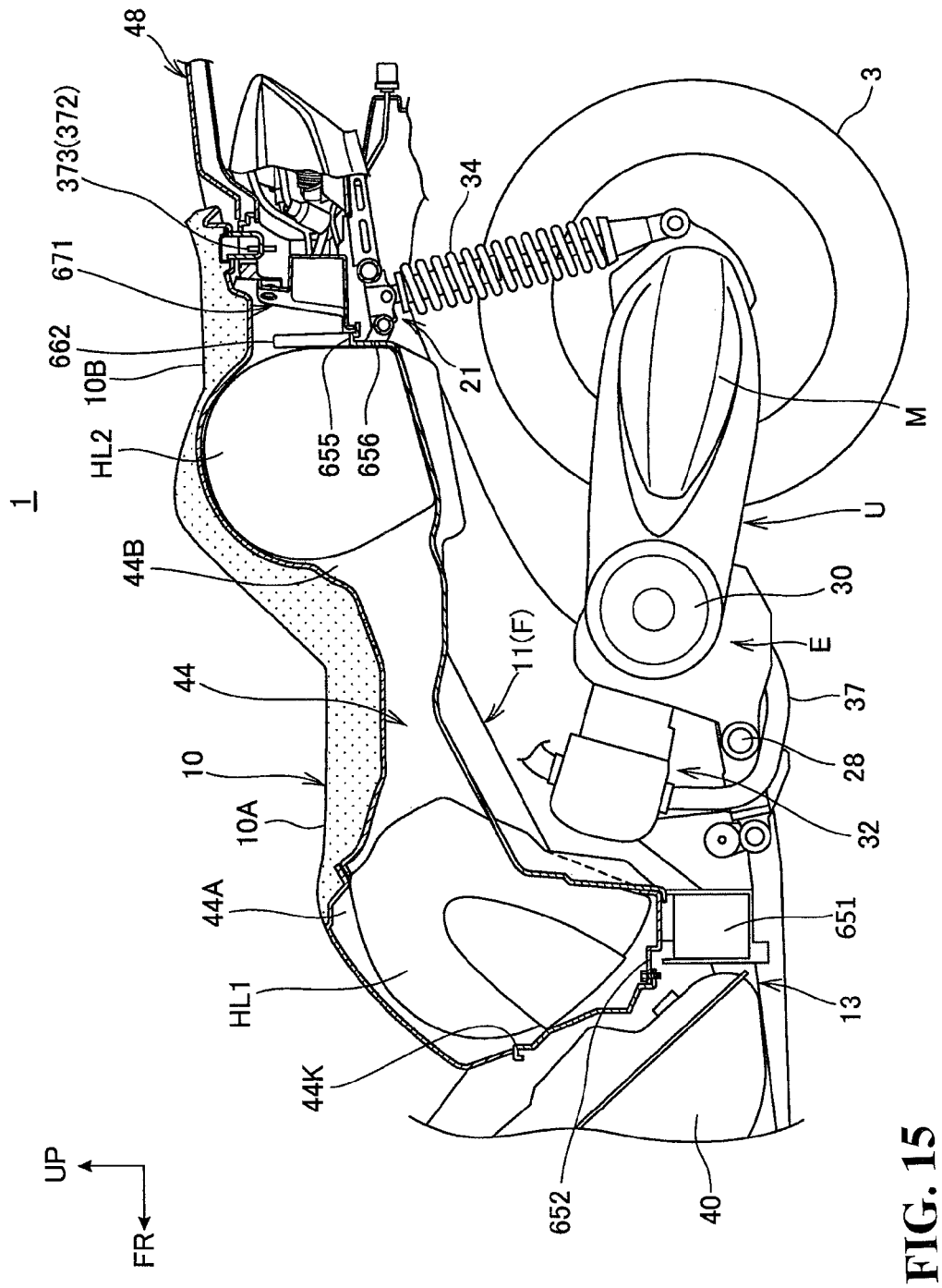
FIG. 15 is a side sectional view showing the storage box together with a peripheral configuration.

FIG. 15 is a side elevational sectional view showing the storage box 44 together with a peripheral configuration.

The front storage region 44A of the storage box 44 is swollen downwardly in front of the intermediate cross member 20 (FIG. 4) that connects the seat rails 14, 14 to each other at an intermediate position in the forward and rearward direction to form a helmet storage section wherein a single helmet HL1 can be accommodated. A battery 651 serving as a power supplying source to the associated components is disposed below the front storage region 44A. In addition, maintenance working or replacement of the battery 651 can be carried out by removing a cover 652 for the bottom plate of the front storage region 44A.

Further, the rear storage region 44B of the storage box 44 is swollen downwardly behind the intermediate cross member 20 (FIG. 4) to form a helmet storage section that can accommodate a single helmet HL2. The rear storage region 44B further has a raised bottom portion 655 that extends rearwardly with a step formed with respect to the bottom of the helmet storage section behind the helmet storage section.

A wall portion 656 that forms a front wall of the raised bottom portion 655 is formed as a wall that is curved in a projecting manner toward the rear as viewed in a top plan view. In other words, the wall portion 656 is formed in a shape wherein it extends, when the helmet HL2 is accommodated in the rear storage region 44B, along an outer edge of the helmet HL2.

The raised bottom portion 655 extends horizontally and rearwardly over the overall width of the rear storage region 44B from an upper edge of the wall portion 656 and rises upwardly at a rear edge thereof such that a sub storage box 671 is formed on the rear of the helmet storage section of the rear storage region 44B. A partition plate 662 extending in the vehicle widthwise direction is removably provided between the sub-storage box 671 and the helmet storage section.

Figure 16:
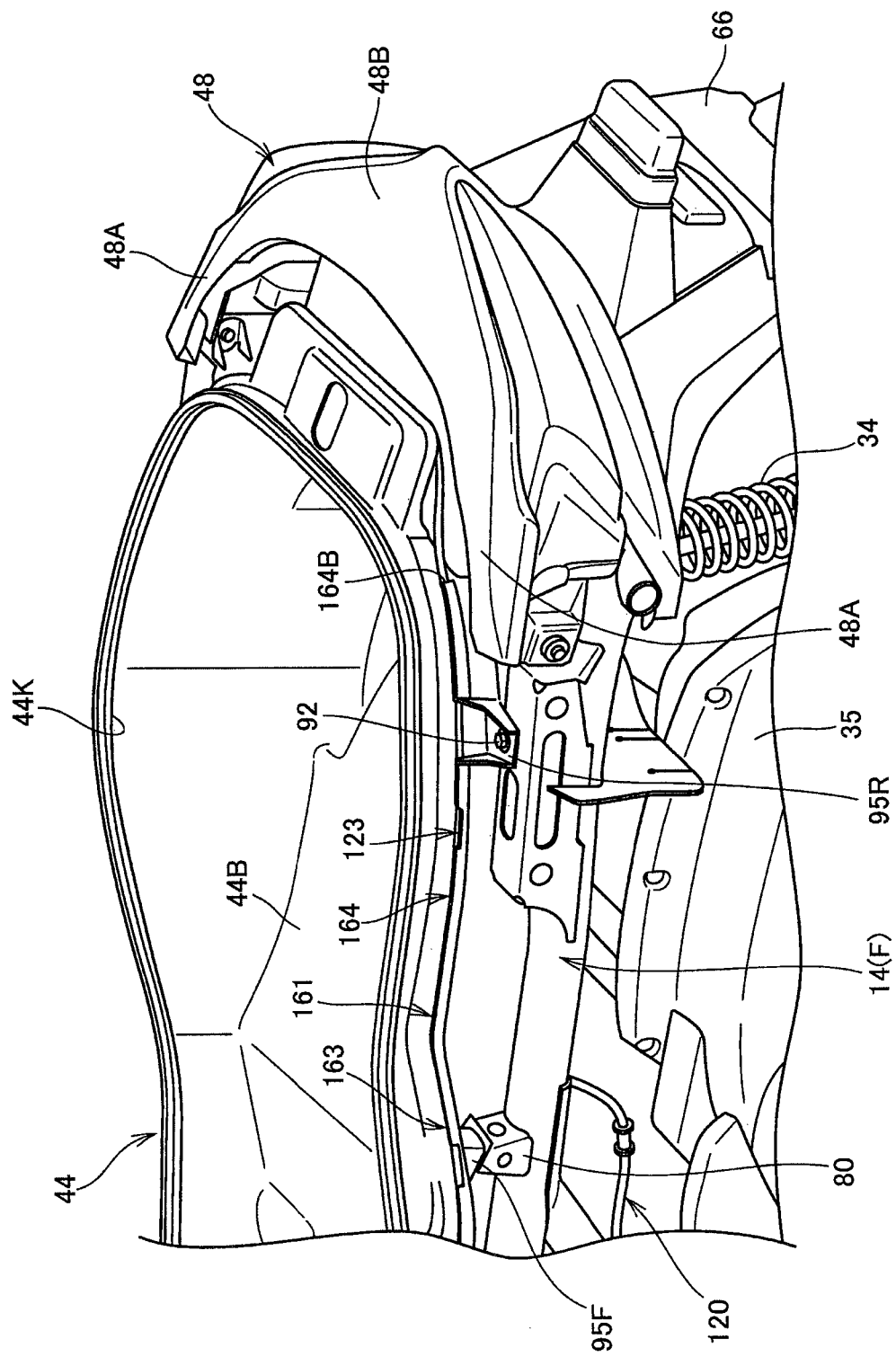
FIG. 16 is a perspective view showing a rear portion of the storage box together with a peripheral configuration.

FIG. 16 is a perspective view showing a rear portion of the storage box 44 together with a peripheral configuration.

The grab rail 48 is formed in a U shape that extends along a rear edge of the rear seat 10B and is open forwardly. The grab rail 48 functions as a grasping member for being grasped by a passenger seated on the rear seat 10B. The grab rail 48 has a pair of left and right arm portions 48A, 48A extending forwardly with a connection portion 48B for connecting the arm portions 48A, 48A to each other. It is to be noted that FIG. 16 illustrates a state wherein the left and right paired body side covers 59, 59 are removed.

As shown in FIGS. 15 and 16, a seat catch plate 373 of the seat lock apparatus 372 for locking the seat 10 is attached to a central portion between the left and right paired arm portions 48A, 48A in the leftward and rightward direction.

The seat lock apparatus 372 is a mechanism also called a seat catch mechanism and is engaged, when the seat 10 is closed, with a seat catch provided at a lower portion of a rear end of the seat 10 to lock the seat 10 in the closed state.

The operational cable 123 for the cancellation of the seat lock that is pulled in response to an operation of the seat lock cancellation apparatus (operational element 143 and so forth) provided at a front portion of the vehicle body is connected at an end thereof to the seat lock apparatus 372. Consequently, the lock of the seat 10 can be canceled by working the operational cable 123.

Also the operational cable 123 has a cable structure wherein an inner cable (sliding member) not shown slidably moves in the inside of an outer cable 123A that configures an outer tube similarly to the operational cable 121 for the lid lock cancellation.

Now, a routing structure for the operational cable 123 is described.

The operational cable 123 is disposed first from the position of the operational element 143 provided on the center panel 138 at a front portion of the vehicle body toward the upper frame 15 on the left side under the guidance of the first cable guide portion 115G (FIG. 9) provided on the lock member 112. Thereafter, the operational cable 123 is disposed under the guidance of the second cable guide portion 116G (FIG. 9) provided on the lock member 112 such that it is inclined rearwardly and downwardly along the upper frame 15 of the left side on the upper face of the upper frame 15 as shown in FIG. 2.

In this instance, since the operational cable 123 is attached to the first and second cable guide portions 115G and 116G from above, the attachment work is easy.

Thereafter, the operational cable 123 is disposed, under the guidance of third and fourth cable guide portions 151 and 161 (FIGS. 2 and 3) formed on the outer side of a peripheral edge of the opening 44K of the storage box 44, in a rearwardly and upwardly inclined relationship such that a valley is provided at a position wherein the left side upper frame 15 and a front end of the storage box 44 are positioned closely to each other. The operational cable 123 is disposed to extend to the seat lock apparatus 372 (FIG. 15) positioned behind the storage box 44. It is to be noted that this routing work can be carried out in a state wherein only the body side cover 59 on the left side is removed.

Figure 17:
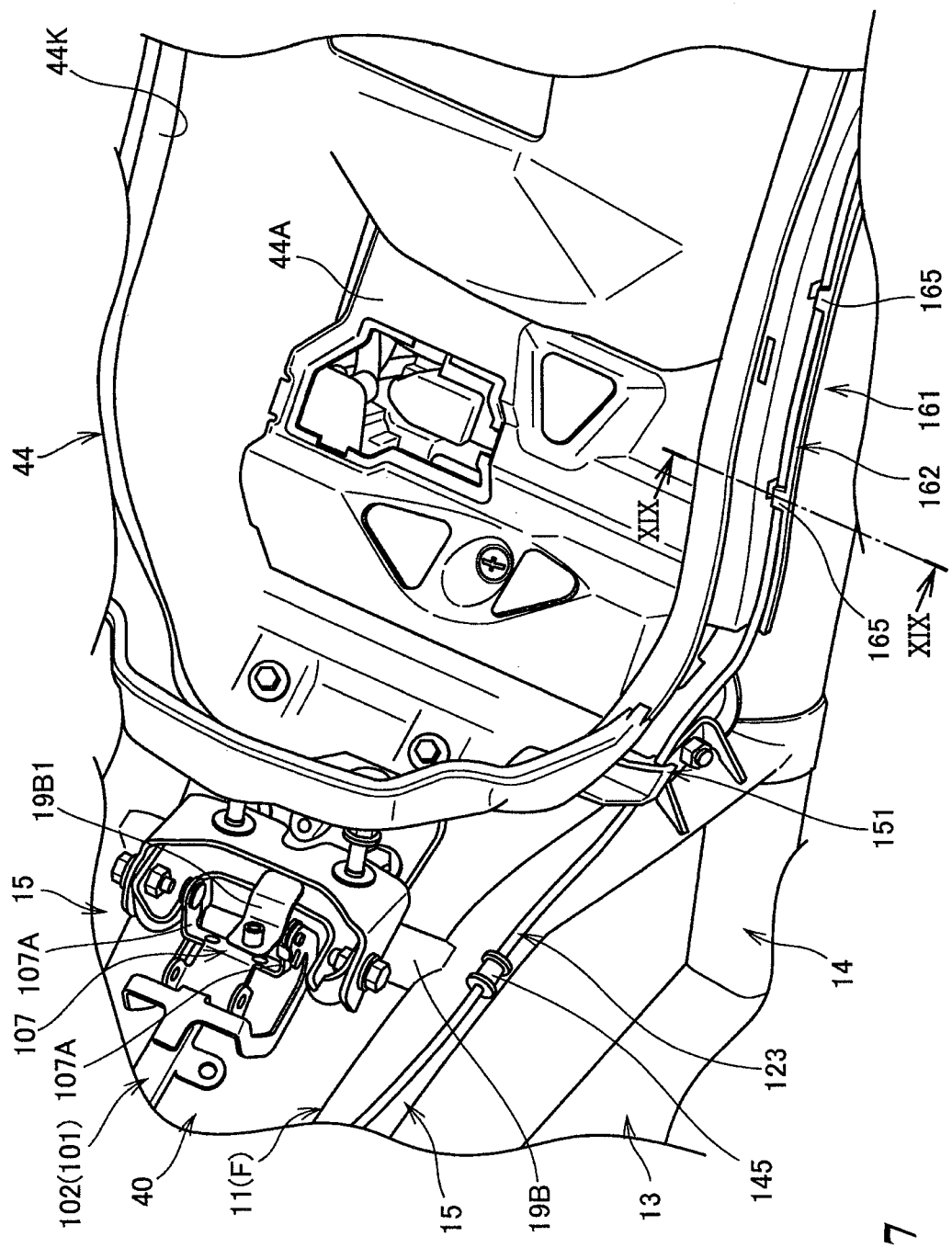
FIG. 17 is a perspective view showing a third cable guide portion together with a peripheral configuration.

As illustrated in FIG. 17, a clamp 145 is provided on the left side upper frame 15 for supporting the operational cable 123. The clamp 145 supports the operational cable 123 between the second cable guide portion 116G provided on the lock member 112 and the third cable guide portion 151 provided on the storage box 44. In this manner, in the present configuration, only the single clamp 145 is provided as a cable supporting member provided on the upper frame 15. In addition, the operational cable 123 is supported at a plurality of points thereof making use of parts (lock member 112 and storage box 44) other than the upper frame 15.

FIG. 17 is a perspective view showing the third cable guide portion 151 together with a peripheral configuration. In addition, FIG. 18 is a view showing a cross section of the third cable guide portion 151 together with a peripheral configuration.

As shown in FIGS. 5, 6 and 17, the third cable guide portion 151 is provided independently and integrally on one side (left side) in the vehicle widthwise direction of a front portion of the storage box 44. Further, as shown in FIG. 18, the third cable guide portion 151 is provided at a position lower than an upper edge of the storage box 44 and is provided at a position in front of the fourth cable guide portion 161 lower than that of the fourth cable guide portion 161.

Figure 18:
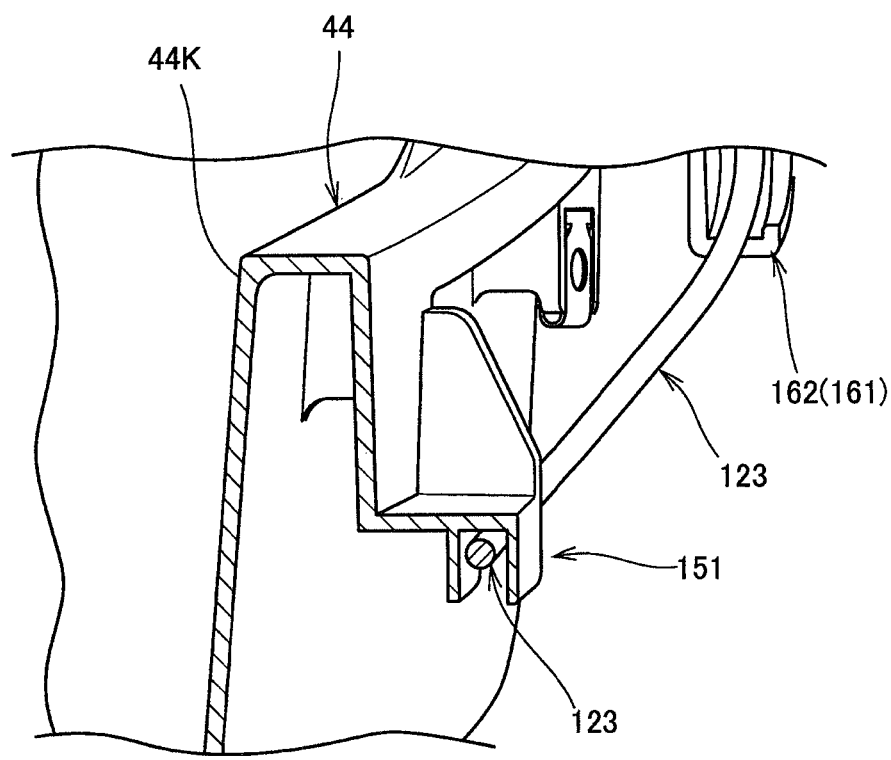
FIG. 18 is a view showing a cross section of the third cable guide portion together with a peripheral configuration.

As shown in FIG. 18, the third cable guide portion 151 is formed in a recessed shape (channel shape) open downwardly for restricting an upper limit position and left and right positions of the operational cable 123. Consequently, the third cable guide portion 151 functions as a curved guide portion for guiding the operational cable 123 in a state that is curved in a downwardly projected state between the rearwardly and downwardly extending upper frame 15 and the fourth cable guide portion 161.

By the third cable guide portion 151, the operational cable 123 can be routed such that it first extends along the rearwardly and downwardly extending upper frame 15 and then is curved moderately and extends toward the fourth cable guide portion 161 positioned at a relatively high position without a great curve.

As shown in FIGS. 17 and 6, the fourth cable guide portion 161 is formed in a shape of a gutter (shape of a groove) wherein it is swollen to the outer side in the vehicle widthwise direction along and in the proximity of an upper edge of the left side wall of the storage box 44 and extends along the upper edge over the forward and rearward direction of the vehicle body.

The fourth cable guide portion 161 is described separately in regard to a front cable guide portion 162 (FIG. 5) that extends rearwardly along an outer peripheral edge of the front storage region 44A, an intermediate cable guide portion 163 (FIG. 5) that extends rearwardly along an outer edge between the front storage region 44A and the rear storage region 44B, and a rear cable guide portion 164 (FIG. 5) that extends rearwardly along an outer peripheral edge of the rear storage region 44B.

The front storage region 44A of the storage box 44 is a region of the smallest width of the storage box 44 as shown in FIGS. 5 and 17 and is formed in a shape of an outer edge that is curved moderately along an outer periphery of the helmet HL1 (FIG. 15) accommodated in the forwardly directed state in the front storage region 44A. Therefore, the front cable guide portion 162 is formed in a curve that is curved moderately along an outer edge of the front storage region 44A as viewed in plan.

More particularly, as shown in FIG. 3, the front cable guide portion 162 is formed in a shape of a gutter that extends rearwardly from a portion of the front storage region 44A, that overlaps with the upper frame 15 as viewed in top plan, along a left side outer edge of the front storage region 44A. Further, the front cable guide portion 162 is formed such that it extends moderately to the inner side in the vehicle widthwise direction toward the rear as shown in FIG. 3.

Figure 19:
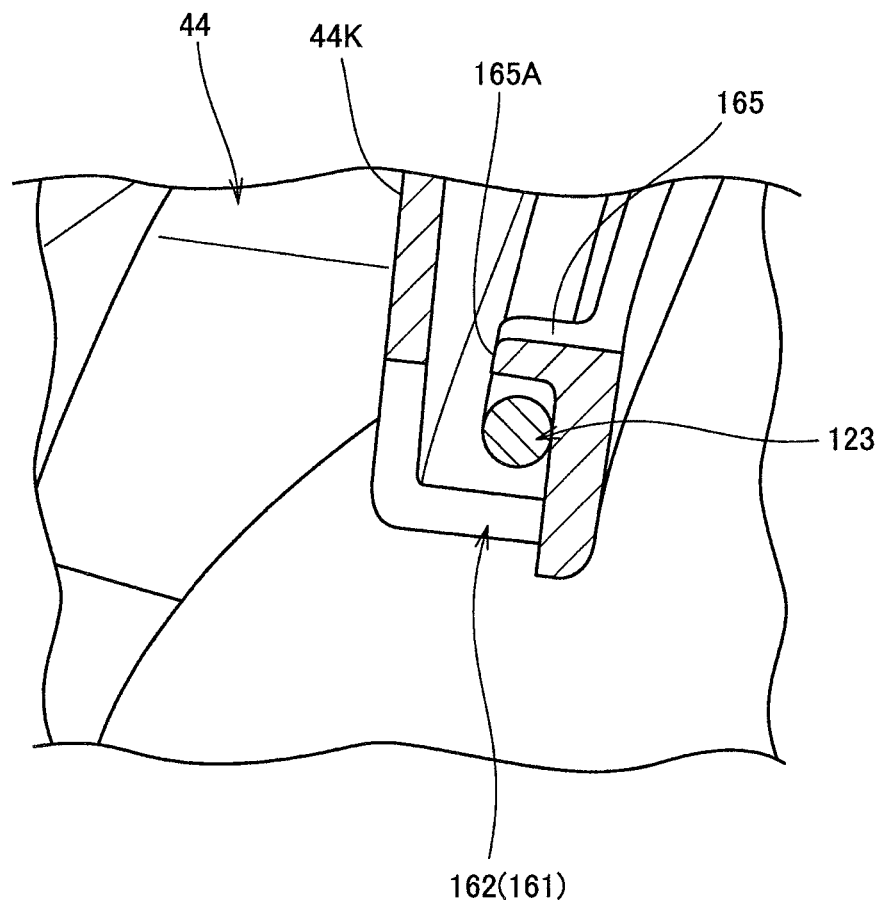
FIG. 19 is a sectional view taken along line XIX-XIX of FIG. 17.

FIG. 19 shows a vertical section of the front cable guide portion 162 (that corresponds to a section taken along line XIX-XIX of FIG. 17) together with a peripheral configuration. As shown in FIG. 19, the front cable guide portion 162 is formed in a recessed shape (channel shape) open upwardly. Further, as shown in FIGS. 19 and 5, a holding down portion 165 for holding down the operational cable 123 in the front cable guide portion 162 from above is provided in the longitudinal direction of the front cable guide portion 162 in a spaced relationship from the front cable guide portion 162.

The holding down portion 165 is provided integrally with the front cable guide portion 162 such that a gap 165A (FIG. 19) through that the operational cable 123 can be inserted from above into the front cable guide portion 162. Thus, the holding down portion 165 can hold down the operational cable 123, that is disposed rather near to the outer side in the vehicle widthwise direction in the front cable guide portion 162, from above as shown in FIG. 19.

As described hereinabove, a pair of left and right projecting portions 95F, 95F (FIG. 5) that project to the outer sides in the vehicle widthwise direction for being fixed to the box stays 80, 80 provided on the seat rails 14, 14 are formed between the front storage region 44A and the rear storage region 44B as described hereinabove. As shown in FIG. 5, the intermediate cable guide portion 163 is formed so as to extend along the outer side of a peripheral edge of the left side projecting portion 95F.

More particularly, the intermediate cable guide portion 163 extends such that a projected portion 163A that is curved in a projected shape to the outer side in the vehicle widthwise direction at a front portion of the left side projecting portion 95F as viewed in plan is formed and a recessed portion 163B is formed on the inner side in the vehicle widthwise direction at a rear portion of the projecting portion 95F are formed as shown in FIG. 5. In other words, the intermediate cable guide portion 163 extends so as to draw a moderate S-shaped curve in plan. Thus, the operational cable 123 is held along this curve.

Figure 20:
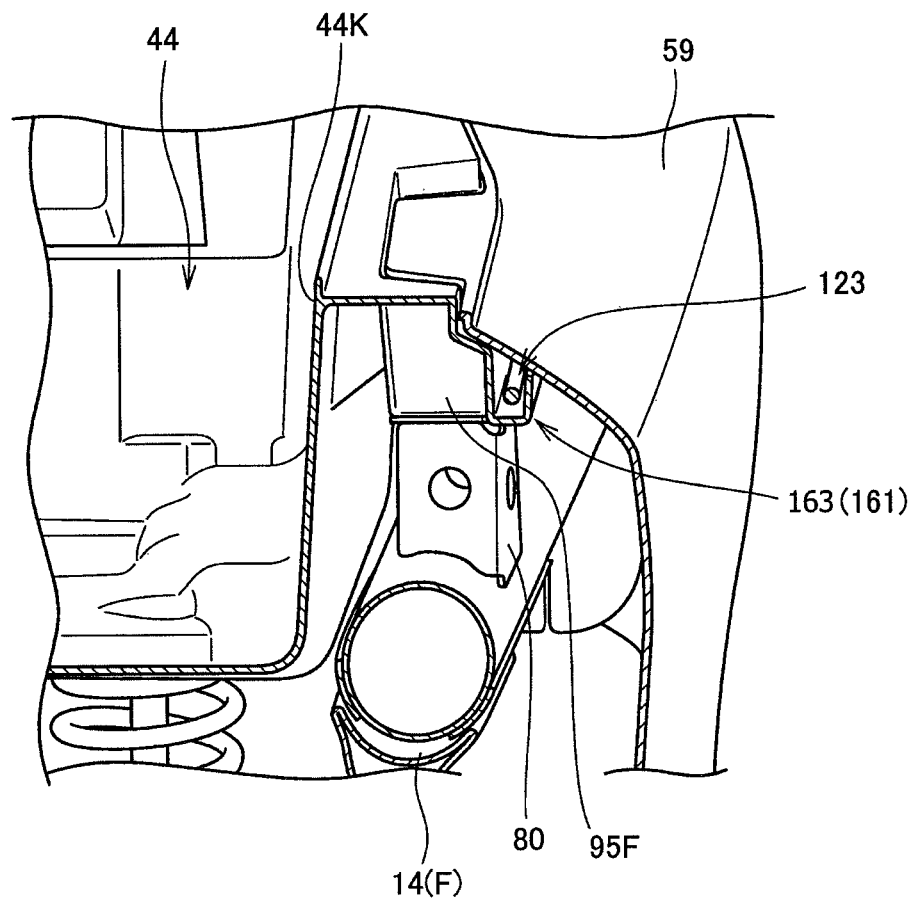
FIG. 20 is a view showing a vertical section of an intermediate portion cable guide portion together with a peripheral configuration.

FIG. 20 shows a vertical section of the intermediate cable guide portion 163 together with a peripheral configuration.

As shown in FIG. 20, also the intermediate cable guide portion 163 has a recessed shape (channel shape) open upwardly and extends in the forward and rearward direction of the vehicle body and includes a holding down portion 165 for holding down the operational cable 123 from above in a spaced relationship in the longitudinal direction similarly to the front cable guide portion 162 described hereinabove.

Since the intermediate cable guide portion 163 holds the operational cable 123 along an S-shape curve as described hereinabove, the operational cable 123 is less liable to be displaced in the longitudinal direction. In addition, at a portion wherein the operational cable 123 is curved on the inner side in the vehicle widthwise direction (for example, the recessed portion 163B), the operational cable 123 is liable to be disposed rather near to the outer side in the vehicle widthwise direction. Thus, the operational cable 123 is suppressed from above by the holding down portion 165 at the location. Further, this arrangement can also make the operational cable 123 less liable to be displaced.

The rear storage region 44B is formed with an increased width with respect to the front storage region 44A because it is fat tied in a shape of an outer edge that is curved moderately along the outer periphery of the helmet HL2 (FIG. 15) that is fitted in a lateral direction in the rear storage region 44B as shown in FIG. 5.

As shown in FIG. 5, the rear cable guide portion 164 is formed along a left side outer edge of the rear storage region 44B. Therefore, the rear cable guide portion 164 extends rearwardly while forming a projecting portion 164A that is moderately curved in a projected shape to the outer side in the vehicle widthwise direction from the rear of the projecting portion 95F. The rear cable guide portion 164 extends to a left side corner portion 164B of the rear storage region 44B.

Also the rear cable guide portion 164 extends in the vehicle body forward and rearward direction in a recessed shape (channel shape) open upwardly and includes a holding down portion 165 for holding down the operational cable 123 from above in a spaced relationship in the longitudinal direction similarly to the front cable guide portion 162 and the intermediate cable guide portion 163 described hereinabove.

The operational cable 123 for the seat lock cancellation is routed so as to be curved moderately along a side of the storage box 44 in this manner. Where the operational cable 123 is routed in a curved state, even if an inner cable 123B in the operational cable 123 is pulled, the outer cable 123A is not liable to be displaced. Thus, the seat lock apparatus 372 can be appropriately operated.

Further, in the present configuration, the operational cable 123 is routed rearwardly and upwardly along an upper edge of the storage box 44 as viewed in a side elevation (FIG. 2). However, the operational cable 123 is routed in a curved state as viewed in a plan view and is held down from above by the holding down portion 165. Therefore, even if the operational cable 123 is routed rearwardly and upwardly, the outer cable 123A is less liable to be displaced. Consequently, the seat lock apparatus 372 can be operated appropriately.

In addition, the body side cover 59 on the left side is mounted such that it covers an outer edge of an upper portion of the storage box 44 from above as shown in FIG. 20. Also the fourth cable guide portion 161 configured from the front cable guide portion 162, intermediate cable guide portion 163 and rear cable guide portion 164 is mounted such that it is covered from above.

In addition, the body side covers 59, 59 are configured such that they are mounted on the vehicle body frame F (seat rails 14) by fastening members not shown and are fastened also to fastening portions 166, 166 (FIG. 5), that are fastening holes provided on the peripheral edge of the opening 44K of the storage box 44, by fastening members 167, 167.

More particularly, the fastening portions 166, 166 are provided in the proximity of the left and right paired projecting portions 95F, 95F of the storage box 44, and the positions are provided substantially at the center position in the forward and rearward direction of the storage box 44. Consequently, the body side covers 59, 59 can be positioned and fixed to the storage box 44 efficiently.

Therefore, in a state wherein the left side body side cover 59 is mounted, the operational cable 123 and the fourth cable guide portion 161 are covered and are not observed from the outside. Accordingly, unintended access of a third party to the operational cable 123 is difficult. Thus, vandalism or the like can be suppressed. Further, the operational cable 123 can be protected against external rain or dust. In addition, since the operational cable 123 and the fourth cable guide portion 161 are disposed making use of the space formed between the body side cover 59 and the storage box 44. Thus, an effective utilization of the space can be achieved.

In this manner, with the present embodiment, the fourth cable guide portion 161 is formed integrally with the storage box 44 and guides the operational cable 123 of the wire cable structure is provided and is formed in a shape of a gutter extending along the outer side of a peripheral edge of the opening 44K of the storage box 44. Therefore, a long guide portion can be formed making use of the peripheral edge of the opening 44K of the storage box 44. Thus, an increase in the number of parts can be suppressed while play in the operational cable 123 is suppressed. Also it is possible to raise the rigidity of the peripheral edge of the opening 44K by the fourth cable guide portion 161.

Further, the operational cable 123 is a cable for the seat lock cancellation that carries out power transmission between the seat lock cancellation apparatus (operational element 143 and so forth) in front of the storage box 44 and the seat lock apparatus 372 behind the storage box 44. Therefore, by providing the cable guide portions 163 and 164 on the peripheral edge of the opening 44K of the storage box 44. Thus, the cable length can be minimized and the operability of the lock cancellation is improved.

Further, the fourth cable guide portion 161 described above is disposed in the space by from the body side cover 59 and the storage box 44 that configure the vehicle body cover C. Therefore, exposure of the operational cable 123 can be suppressed. Thus, access to the operational cable 123 can be made more difficult thereby to suppress vandalism or the like.

Further, the peripheral edge of the opening 44K of the storage box 44 includes the curved portions that form the projected portions 163A and 164A and the recessed portion 163B (front storage region 44A, projecting portion 95F and rear storage region 44B) as viewed in plan. Therefore, the peripheral edge of the opening 44K can guide the operational cable 123 in a curved state. Thus, the necessity for a special fixing member for positioning the operational cable 123 in the longitudinal direction can be eliminated. As a result, play in the operational cable 123 can be reduced by a simple and easy configuration.

Further, the fourth cable guide portion 161 is formed in a channel shape (recessed state) open upwardly, and the vehicle body cover C (body side cover 59) is disposed at an open side end portion of the channel shape. Therefore, the circumference of the operational cable 123 can be surrounded by the fourth cable guide portion 161 and the vehicle body cover C as shown in FIG. 20. Consequently, the guide effect of the operational cable 123 can be enhanced and also protection of the operational cable 123 can be achieved.

Furthermore, the operational cable 123 is routed from an upper portion of the upper frame 15 that configures the down frame to the rear portion side of the seat rail 14. In addition, the storage box 44 extends to a position wherein it overlaps with the upper frame 15 as viewed in side elevation. Further, the third cable guide portion (curved guide portion) 151 for guiding the operational cable 123 in a curved state is formed integrally on the storage box 44 in front of the fourth cable guide portion 161. Therefore, the cable guides on the vehicle body frame F side can be reduced as far as possible thereby to reduce the number of parts.

Further, the fastening portions 166, 166 that function as fixing portions to which the vehicle body cover C is fixed are provided on the vehicle body cover C and the peripheral edge of the opening 44K of the storage box 44. Therefore, access to the operational cable 123 can be made more difficult.

The embodiment described above indicates a mode of the present invention to the end and can be modified and applied arbitrarily without departing from the subject matter of the present invention.

For example, in the embodiment described above, the lock member 112 for locking the lid fuel 101 is fixed to the upper inner cover 53 and placed on the upper frames 15, 15. However, the lock member 112 may be fixed to a portion of the vehicle body cover C other than the upper inner cover 53 and placed at a portion of the vehicle body frame F other than the upper frames 15, 15. Further, the locking member for locking the lid 101 is not limited to the lock member 112, but a locking member that can lock the lid that covers an opening provided on the vehicle body cover C for opening and closing movement may be set to the vehicle body cover C and placed on the vehicle body frame F below the vehicle body cover C.

Further, in the embodiment described hereinabove, the third and fourth cable guide portions 151 and 161 for guiding the operational cable 123 for the seat lock cancellation are provided on the storage box 44. However, guide portions for guiding various pipes such as an operational cable other than the operational cable 123 for the seat lock cancellation may be provided.

Further, the above-described configuration of the present invention can be applied not only to the motorcycle 1 but also to any saddle type vehicle other than a motorcycle. It is to be noted that the saddle type vehicle includes general vehicles on which an occupant rides across a vehicle body and includes not only a motorcycle (including a bicycle with a prime mover) but also a three-wheeled vehicle and a four-wheeled vehicle that are classified as an ATV (all terrain vehicle).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A routing structure for a saddle vehicle including a storage box and a guide portion formed integrally with the storage box and configured to guide a pipe, comprising:
   said pipe is a cable including an outer tube and a sliding article disposed inside the outer tube; and
   the guide portion is formed in a shape of a gutter along an outer side of a peripheral edge of an opening of the storage box, and
   the peripheral edge of the opening of the storage box is formed with a U-shaped cross section.

2. The routing structure for a saddle vehicle according to claim 1, and further including a seat for covering the storage box for opening or closing the storage box, said seat being mounted above the storage box and said storage box being formed long in a forward and rearward direction of the vehicle; and
   a seat lock apparatus mounted behind the storage box;
   a seat lock cancellation apparatus mounted in front of the storage box; and
   said pipe is a seat locking cable for actuating the seat lock apparatus.

3. The routing structure for a saddle vehicle according to claim 1, wherein:
   a vehicle body cover is provided on the outer side of the guide portion, and
   the guide portion is disposed in a space formed by the vehicle body cover and the storage box.

4. The routing structure for a saddle vehicle according to claim 2, wherein:
   a vehicle body cover is provided on the outer side of the guide portion, and
   the guide portion is disposed in a space formed by the vehicle body cover and the storage box.

5. The routing structure for a saddle vehicle according to claim 1, wherein the peripheral edge of the opening of the storage box includes a curved portion that forms a projecting portion or a recesses portion as viewed in plan.

6. The routing structure for a saddle vehicle according to claim 2, wherein the peripheral edge of the opening of the storage box includes a curved portion that forms a projecting portion or a recesses portion as viewed in plan.

7. The routing structure for a saddle vehicle according to claim 3, wherein the peripheral edge of the opening of the storage box includes a curved portion that forms a projecting portion or a recesses portion as viewed in plan.

8. The routing structure for a saddle vehicle according to claim 1, wherein the guide portion is formed in a recessed shape open upwardly, and a vehicle body cover is disposed at an end portion of the guide portion on the open side.

9. The routing structure for a saddle vehicle according to claim 2, wherein the guide portion is formed in a recessed shape open upwardly, and a vehicle body cover is disposed at an end portion of the guide portion on the open side.

10. The routing structure for a saddle vehicle according to claim 3, wherein the guide portion is formed in a recessed shape open upwardly, and a vehicle body cover is disposed at an end portion of the guide portion on the open side.

11. The routing structure for a saddle vehicle according to claim 5, wherein the guide portion is formed in a recessed shape open upwardly, and a vehicle body cover is disposed at an end portion of the guide portion on the open side.

12. The routing structure for a saddle vehicle according to claim 1, and further including a head pipe, a down frame extending downwardly and rearwardly from the head pipe and a seat rail connected to the down frame and extending upwardly and rearwardly from the down frame; and the pipe is routed from an upper portion of the down frame to a rear portion side of the seat rail and extends to a position wherein the storage box overlaps with the down frame as viewed in side elevation, and a curved guide portion for guiding the pipe in a curved state is formed integrally on the storage box in front of the guide portion.

13. The routing structure for a saddle vehicle according to claim 2, and further including a head pipe, a down frame extending downwardly and rearwardly from the head pipe and a seat rail connected to the down frame and extending upwardly and rearwardly from the down frame; and the pipe is routed from an upper portion of the down frame to a rear portion side of the seat rail and extends to a position wherein the storage box overlaps with the down frame as viewed in side elevation, and a curved guide portion for guiding the pipe in a curved state is formed integrally on the storage box in front of the guide portion.

14. The routing structure for a saddle vehicle according to claim 3, and further including a head pipe, a down frame extending downwardly and rearwardly from the head pipe and a seat rail connected to the down frame and extending upwardly and rearwardly from the down frame; and the pipe is routed from an upper portion of the down frame to a rear portion side of the seat rail and extends to a position wherein the storage box overlaps with the down frame as viewed in side elevation, and a curved guide portion for guiding the pipe in a curved state is formed integrally on the storage box in front of the guide portion.

15. The routing structure for a saddle vehicle according to claim 5, and further including a head pipe, a down frame extending downwardly and rearwardly from the head pipe and a seat rail connected to the down frame and extending upwardly and rearwardly from the down frame; and the pipe is routed from an upper portion of the down frame to a rear portion side of the seat rail and extends to a position wherein the storage box overlaps with the down frame as viewed in side elevation, and a curved guide portion for guiding the pipe in a curved state is formed integrally on the storage box in front of the guide portion.

16. The routing structure for a saddle vehicle according to claim 8, and further including a head pipe, a down frame extending downwardly and rearwardly from the head pipe and a seat rail connected to the down frame and extending upwardly and rearwardly from the down frame; and the pipe is routed from an upper portion of the down frame to a rear portion side of the seat rail and extends to a position wherein the storage box overlaps with the down frame as viewed in side elevation, and a curved guide portion for guiding the pipe in a curved state is formed integrally on the storage box in front of the guide portion.

17. A routing structure for a saddle vehicle comprising:
a storage box;
a guide portion formed integrally with the storage box and configured to guide a an outer tube; and
a sliding article disposed inside the outer tube;
said guide portion being formed in a shape of a gutter along an outer side of a peripheral edge of an opening of the storage box, and
the peripheral edge of the opening of the storage box is formed with a U-shaped cross section.

18. The routing structure for a saddle vehicle according to claim 17, and further including a seat for covering the storage box for opening or closing the storage box, said seat being mounted above the storage box with said storage box being formed long in a forward and rearward direction of the vehicle; and
a seat lock apparatus mounted behind the storage box;
a seat lock cancellation apparatus mounted in front of the storage box; and
the sliding article is a seat locking cable for actuating the seat lock apparatus.

19. The routing structure for a saddle vehicle according to claim 1, when the storage box is viewed in side view, the guide portion is seen to be arranged below an uppermost portion of the peripheral edge.

20. The routing structure for a saddle vehicle according to claim 17, when the storage box is viewed in side view, the guide portion is seen to be arranged below an uppermost portion of the peripheral edge.

* * * * *